May 23, 1939.　　　E. R. ALLING　　　2,159,000
EMPTYING DEVICE AND METHOD
Filed Nov. 26, 1937　　11 Sheets-Sheet 1

INVENTOR
E. Roy Alling
BY
Parker, Rockwood & Lame
ATTORNEYS

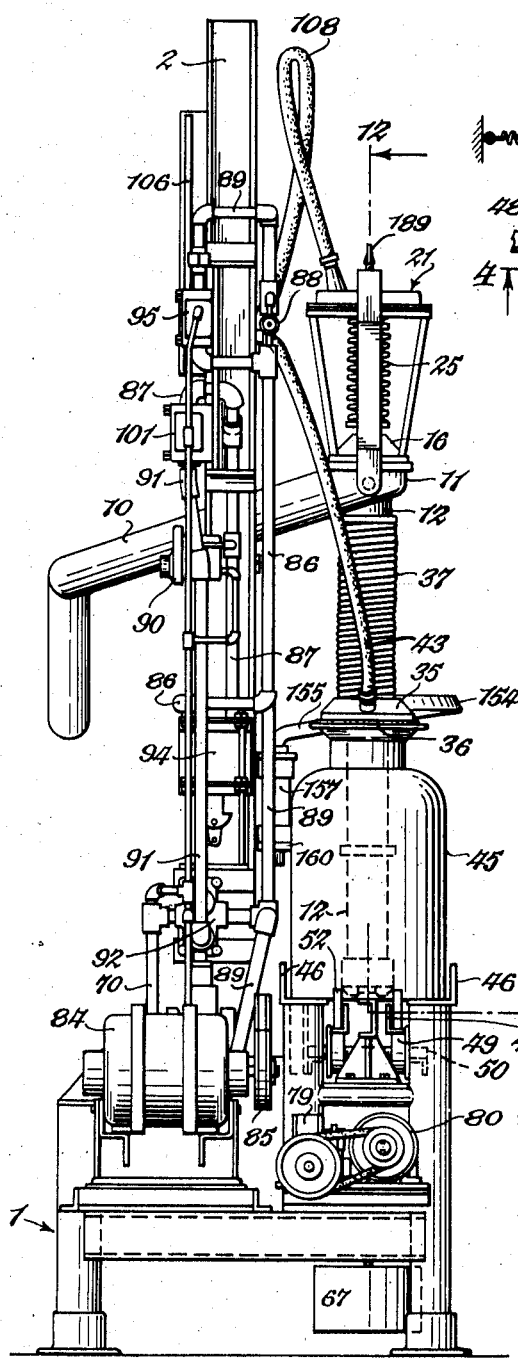
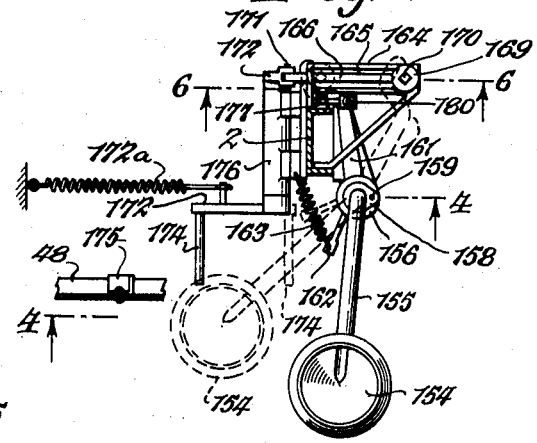

May 23, 1939.  E. R. ALLING  2,159,000
EMPTYING DEVICE AND METHOD
Filed Nov. 26, 1937    11 Sheets-Sheet 3
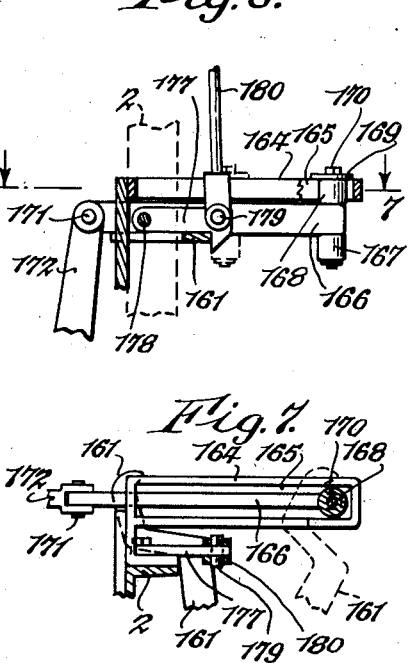
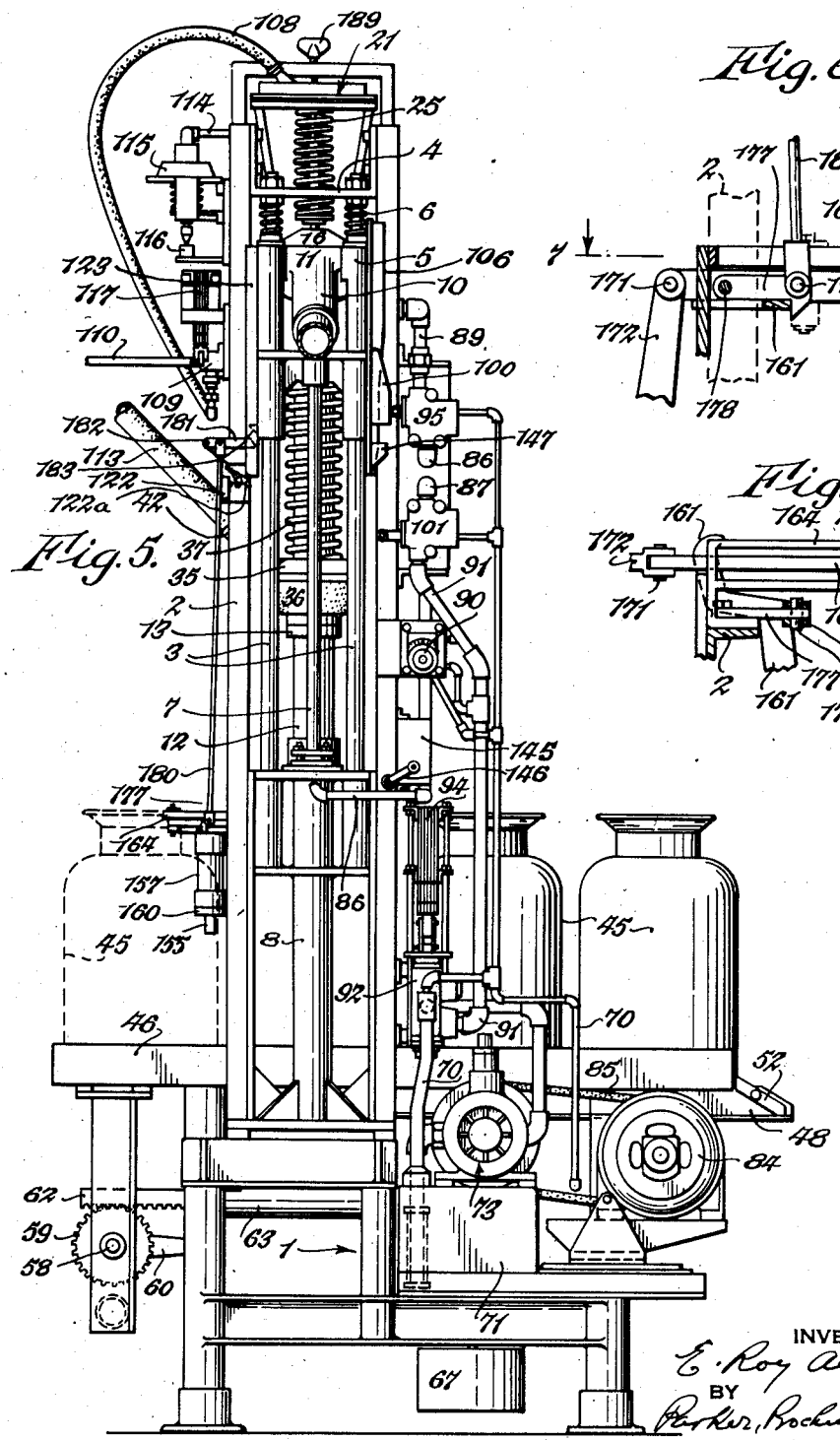
INVENTOR
E. Roy Alling
BY
Parker, Rockwood & Farmer
ATTORNEYS May 23, 1939.  E. R. ALLING  2,159,000
EMPTYING DEVICE AND METHOD
Filed Nov. 26, 1937   11 Sheets-Sheet 4
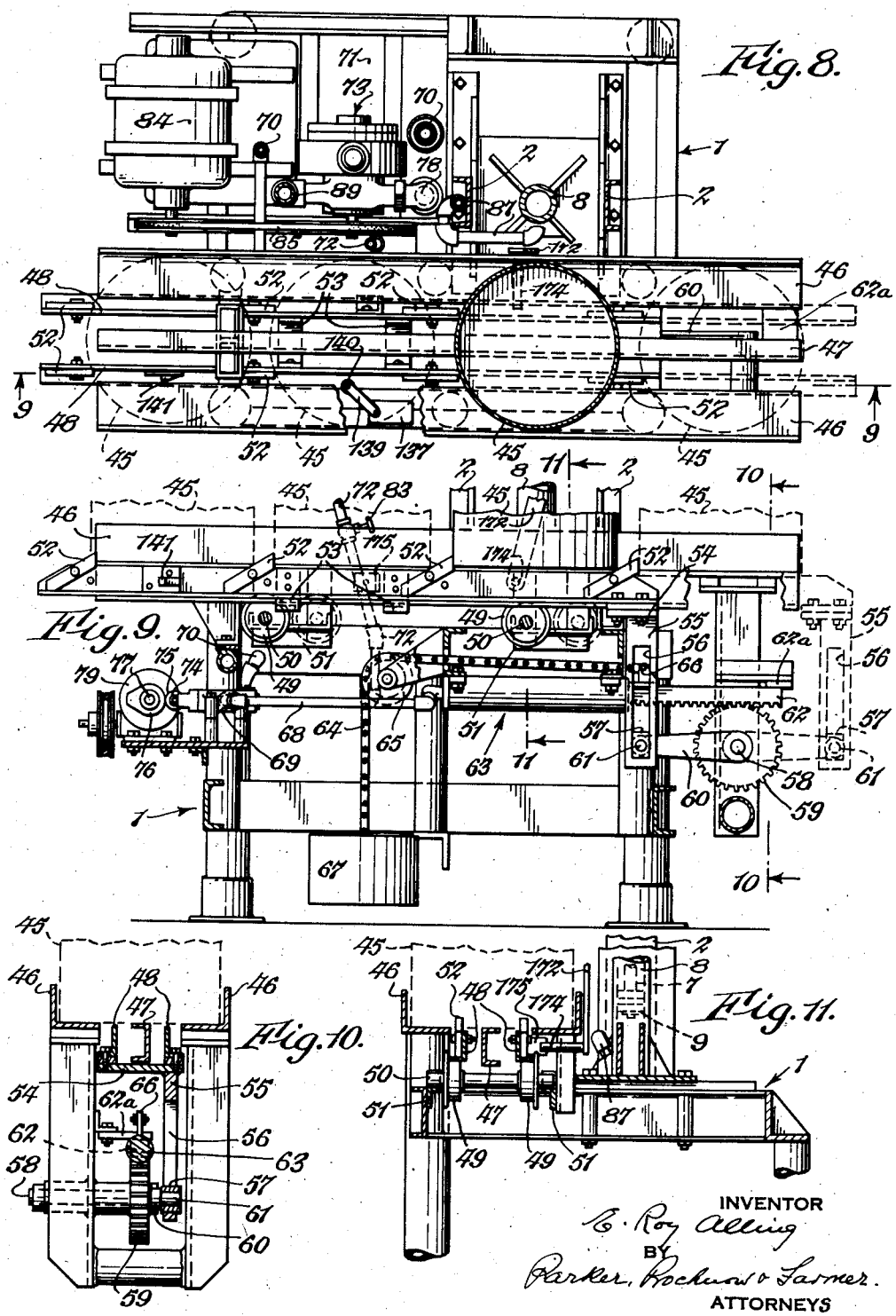
INVENTOR
E. Roy Alling
BY
Parker, Brockway & Farmer.
ATTORNEYS

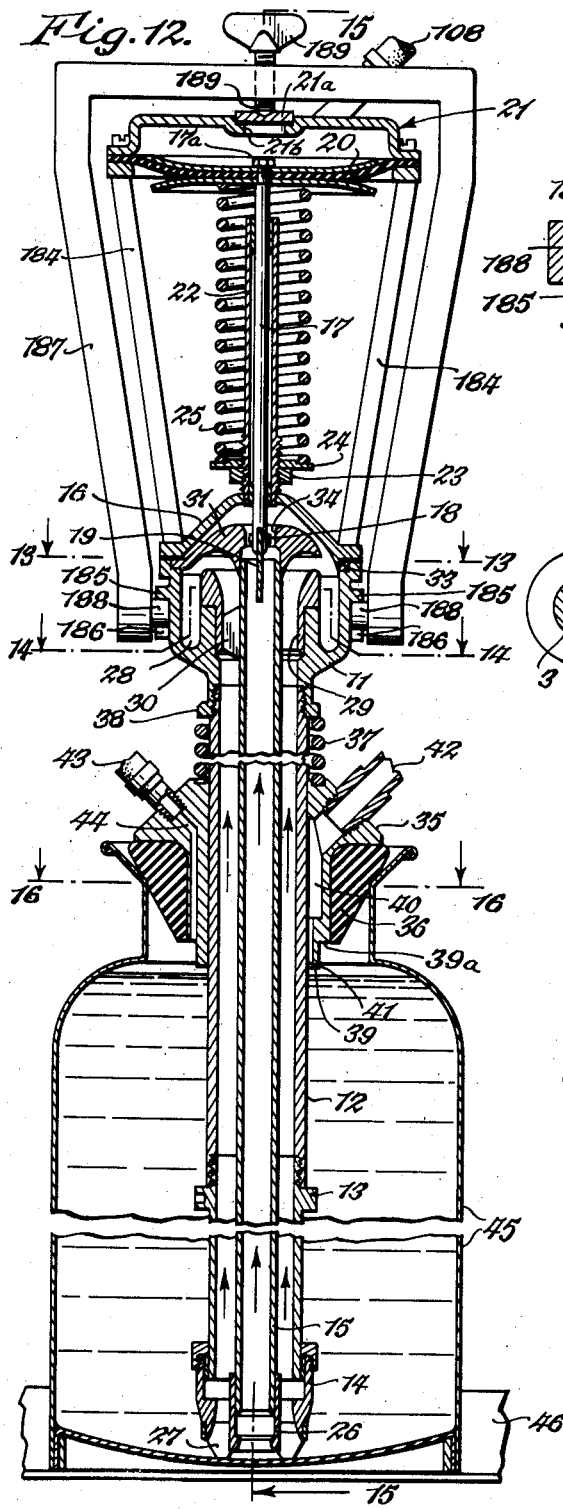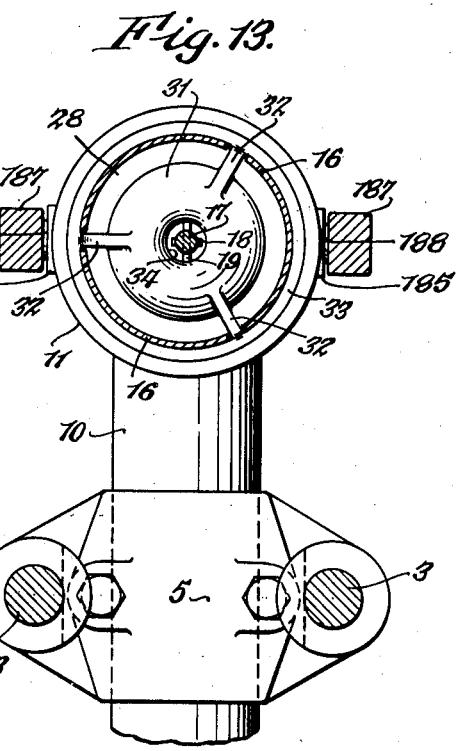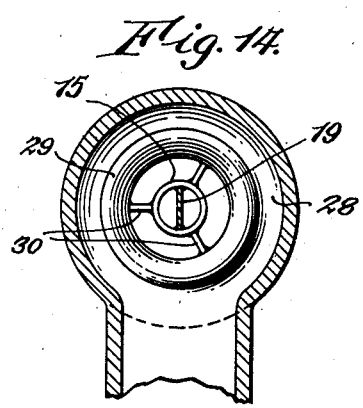

May 23, 1939.　　　E. R. ALLING　　　2,159,000
EMPTYING DEVICE AND METHOD
Filed Nov. 26, 1937　　11 Sheets-Sheet 6

INVENTOR
E. Roy Alling
BY
Parker, Rockwood & Farmer.
ATTORNEYS

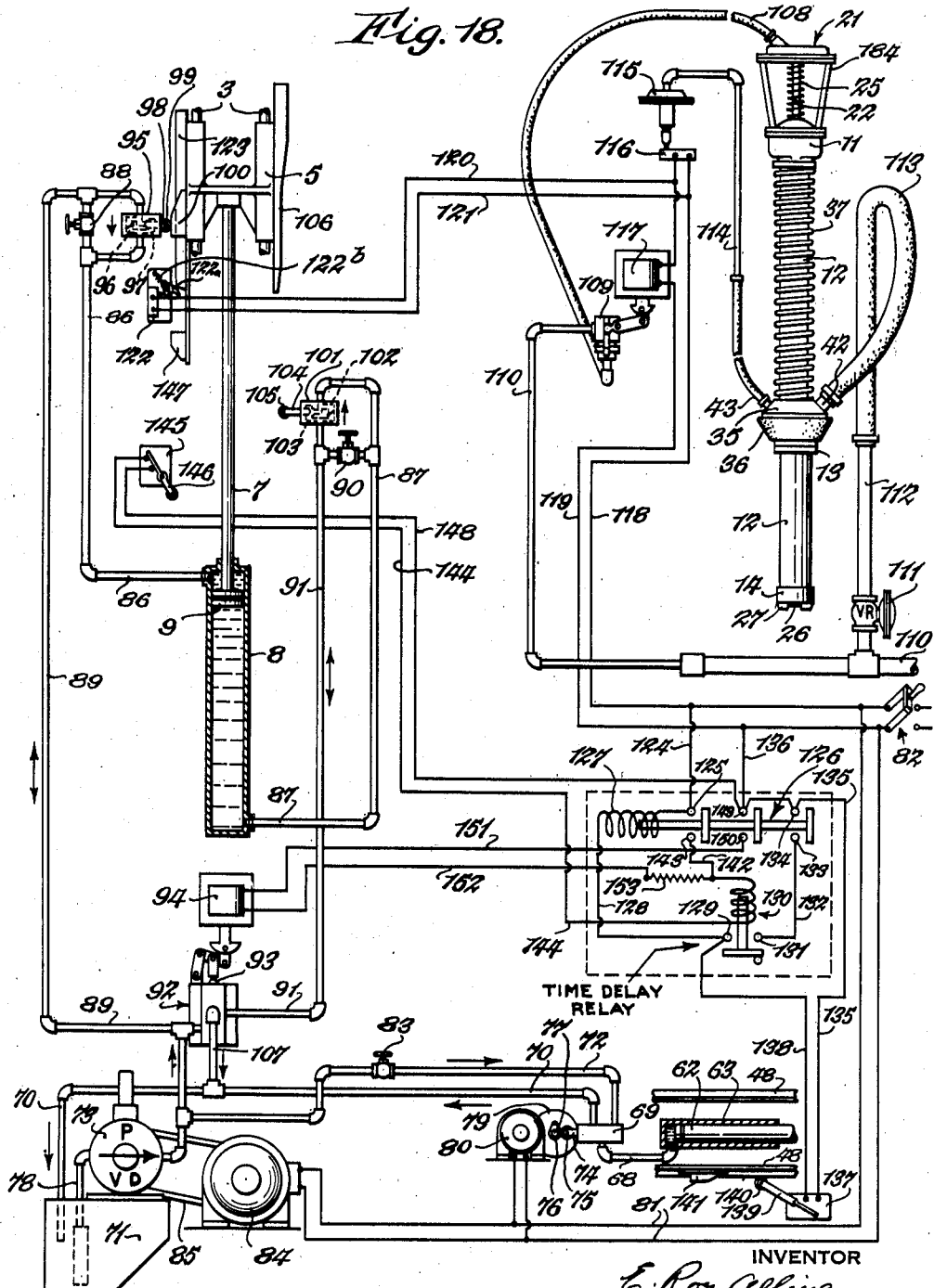

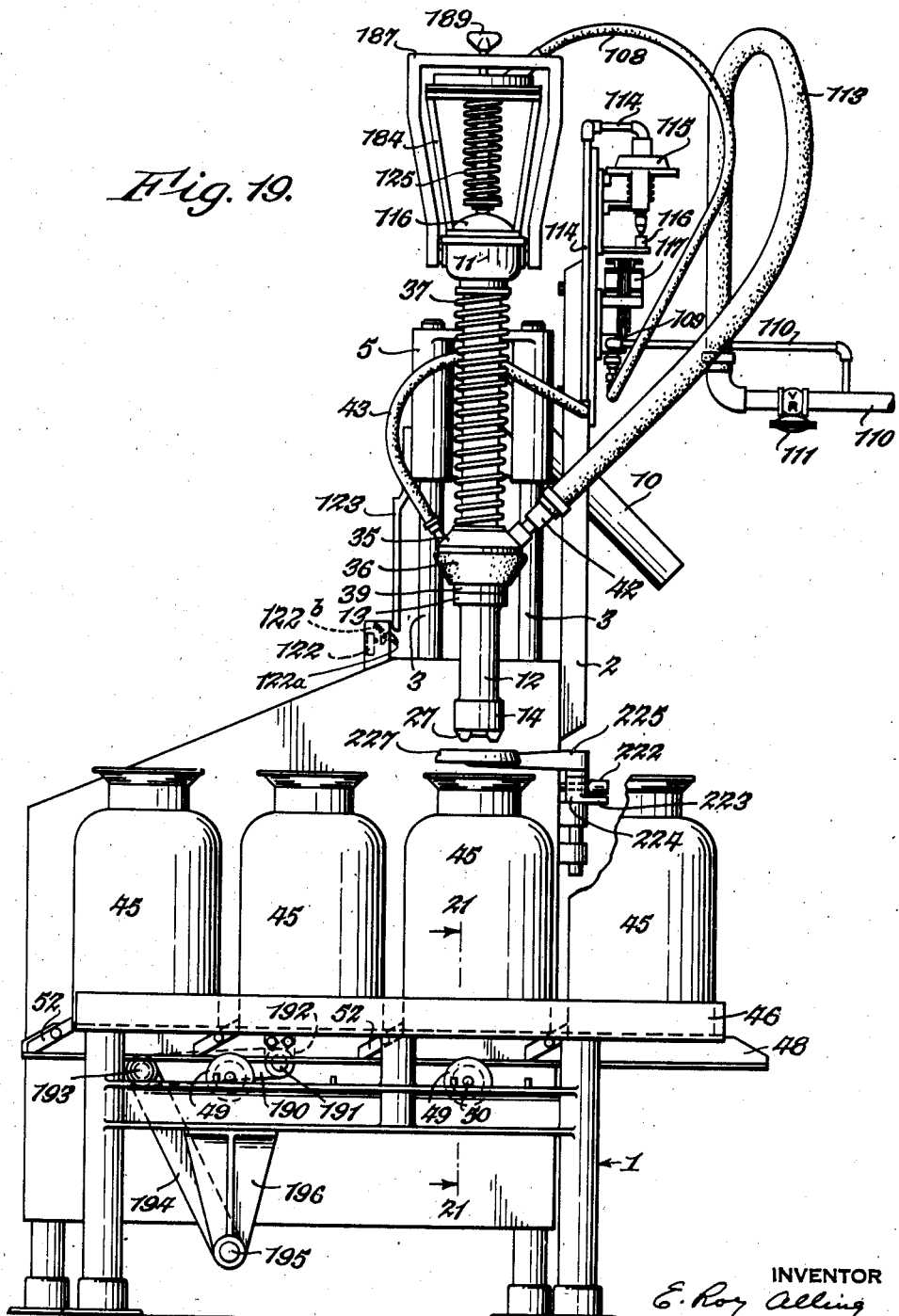

May 23, 1939.  E. R. ALLING  2,159,000
EMPTYING DEVICE AND METHOD
Filed Nov. 26, 1937  11 Sheets-Sheet 9
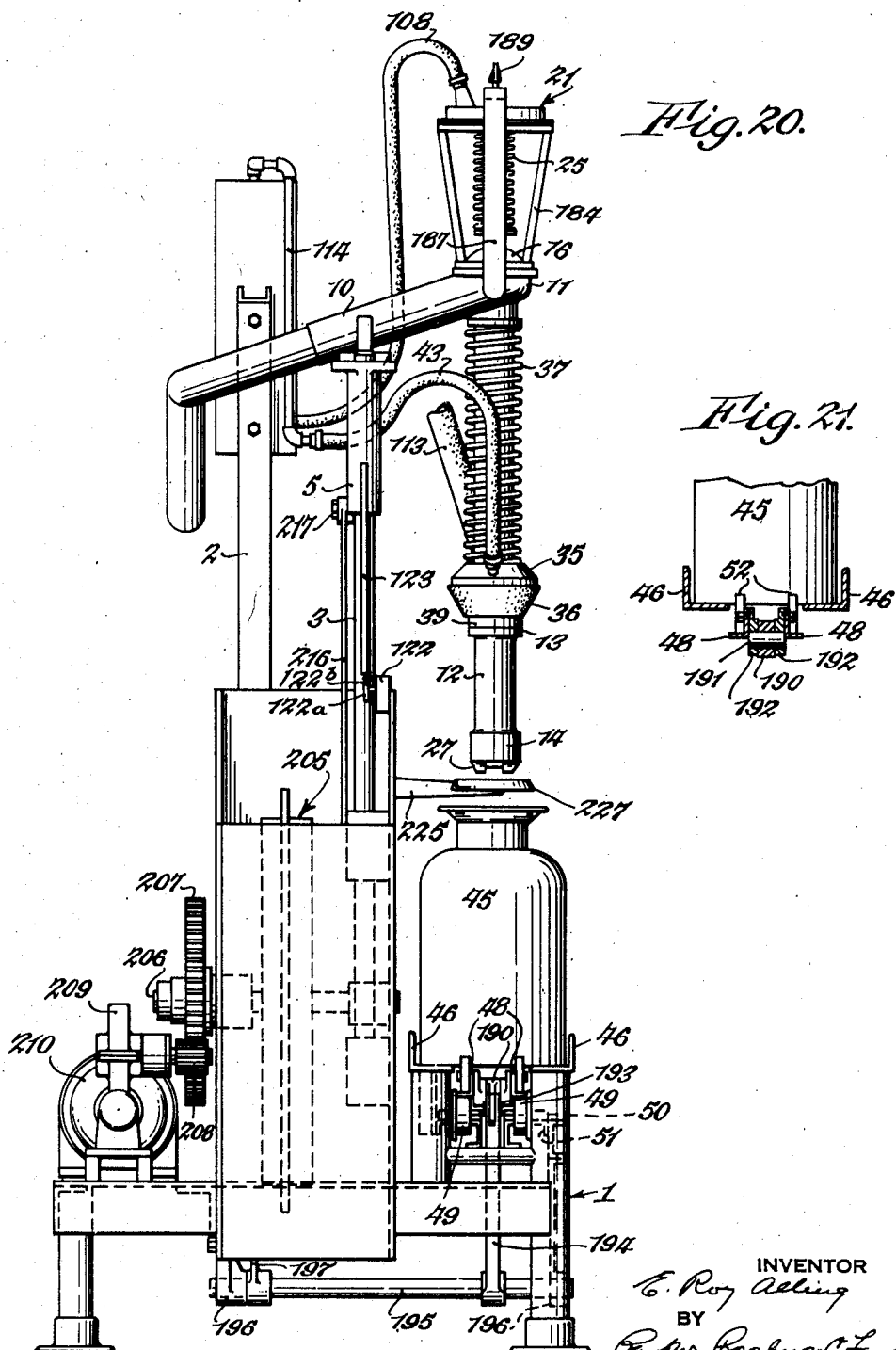
INVENTOR
E. Roy Alling
BY
Parker, Rockwood Farmer.
ATTORNEYS May 23, 1939.  E. R. ALLING  2,159,000
EMPTYING DEVICE AND METHOD
Filed Nov. 26, 1937   11 Sheets-Sheet 10
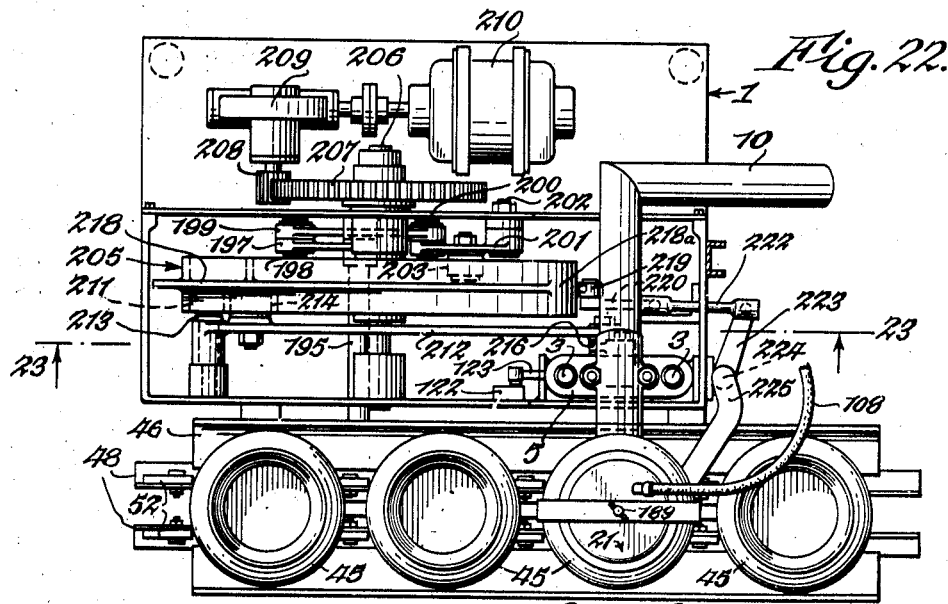
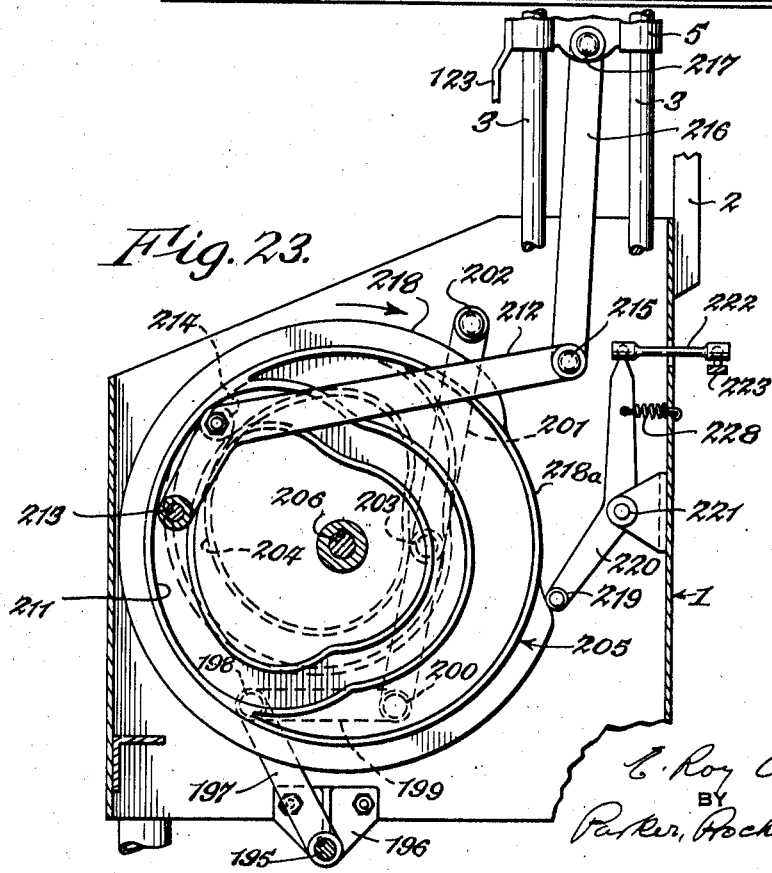
INVENTOR
E. Roy Alling
BY
Parker, Brockmow & Farmer
ATTORNEYS

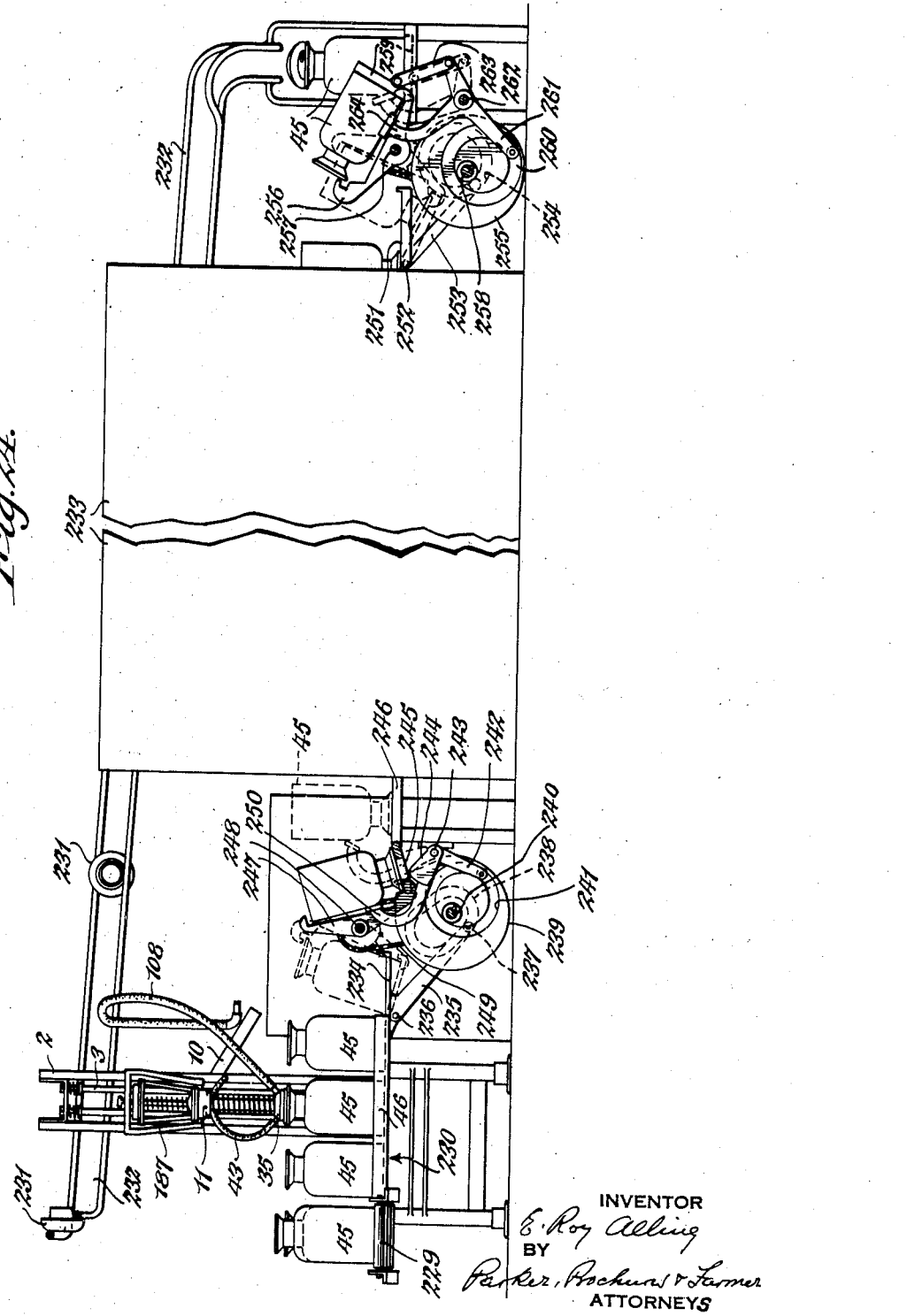

Patented May 23, 1939

2,159,000

UNITED STATES PATENT OFFICE 2,159,000

EMPTYING DEVICE AND METHOD

E. Roy Alling, Kenmore, N. Y.

Application November 26, 1937, Serial No. 176,458

36 Claims. (Cl. 221—69)

This invention relates to the emptying of containers while said containers are supported in approximately upright positions, and is particularly valuable in the emptying of milk from cans. In the dairy industry, for example, the fluid milk is carried to assembly points or dairy plants in large metal cans and there the cans are emptied, and their contents weighed and sampled. Such cans have been commonly emptied by inverting them over a tank, and, unless the cans have previously been washed, considerable dirt on the exterior of the cans is likely to fall into the tank with the milk and contaminate it. The cans are difficult to wash and sterilize exteriorly, when filled, for the reason that the relatively cold milk in the cans prevents heat sterilization of the cans. The cans are difficult to dry when filled with relatively cold milk, and the inverting of said cans is apt to cause some of the moisture on the exterior of the cans to fall in the tank with the milk and contaminate and dilute the same.

An object of this invention is to provide improved means by which any containers or cans may be rapidly emptied while in upright positions, with maximum of cleanliness and freedom from contamination of the can or container, and with which contents remaining after an emptying operation will be a minimum.

Another object is to provide improved means for accomplishing this purpose, with which the contents will be protected largely from air contamination during the emptying, with which loss through drip from the emptying conduits will be a minimum, and which will be relatively simple and inexpensive.

Another object of the invention is to provide an improved means for emptying upright containers while they remain upright with maximum rapidity and completeness, and in a simple and inexpensive manner.

Another object of the invention is to provide an improved system for emptying milk cans and the like, cleansing them, and delivering them in upright positions, such as a continuous operation, and which will be relatively simple, efficient and inexpensive, and require a minimum of manual labor and attention.

Another object of the invention is to provide an improved method for emptying upright containers while they remain upright, by applying an emptying fluid to the containers and establishing pressure differences on the contents to be removed, with which a minimum consumption of actuating fluid will be necessary, and which will be equally effective on containers of different heights.

Other objects and advantages will be apparent from the following description of two embodiments of the invention, and the novel features will be particularly pointed out hereinafter in connection with the appended claims.

In the accompanying drawings:

Fig. 2 is an end elevation of the same;

Fig. 3 is a sectional plan through a portion of the same, to illustrate the drip saving feature thereof, the section being taken approximately along the line 3—3 of Fig. 1;

Fig. 4 is a sectional elevation through a portion of the same drip saving features, the section being taken approximately along the line 4—4 of Fig. 3;

Fig. 5 is a rear elevation of the apparatus;

Fig. 6 is a sectional elevation through another portion of the drip saving mechanism, the section being taken approximately along the line 6—6 of Fig. 3;

Fig. 7 is a sectional plan through the mechanism shown in Fig. 6, the section being taken approximately along the line 7—7 of Fig. 6;

Fig. 8 is a sectional plan through the apparatus, the section being taken approximately along the line 8—8 of Fig. 1;

Fig. 9 is a sectional elevation through the can feeding mechanism of the same, the section being taken approximately along the line 9—9 of Fig. 8;

Fig. 10 is a sectional elevation through a portion of the same, the section being taken approximately along the line 10—10 of Fig. 9;

Fig. 11 is a sectional elevation through another portion of the can feeding mechanism, the section being taken approximately along the line 11—11 of Fig. 9;

Fig. 12 is a sectional elevation through the emptying mechanism at the start of the removal of milk from a can, the section being taken approximately along the line 12—12 of Fig. 2;

Fig. 13 is a sectional plan through the same, the section being taken approximately along the line 13—13 of Fig. 12;

Fig. 14 is another sectional plan through the same, the section being taken approximately along the line 14—14 of Fig. 12;

Fig. 18 is a schematic diagram of the mechanism shown in Figs. 1 to 17 and of the connections and controls forming a part thereof, by which the principle and mode of operation of the invention may be more easily explained;

Fig. 19 is a front elevation of a can emptying mechanism also constructed in accordance with the invention, and illustrating a modification of the same;

Fig. 20 is an end elevation of the same;

Fig. 21 is a sectional elevation through a portion of the can feeding mechanism of the same, the section being taken approximately along the line 21—21 of Fig. 19;

Fig. 22 is a top plan of this modified apparatus;

Figure 1:
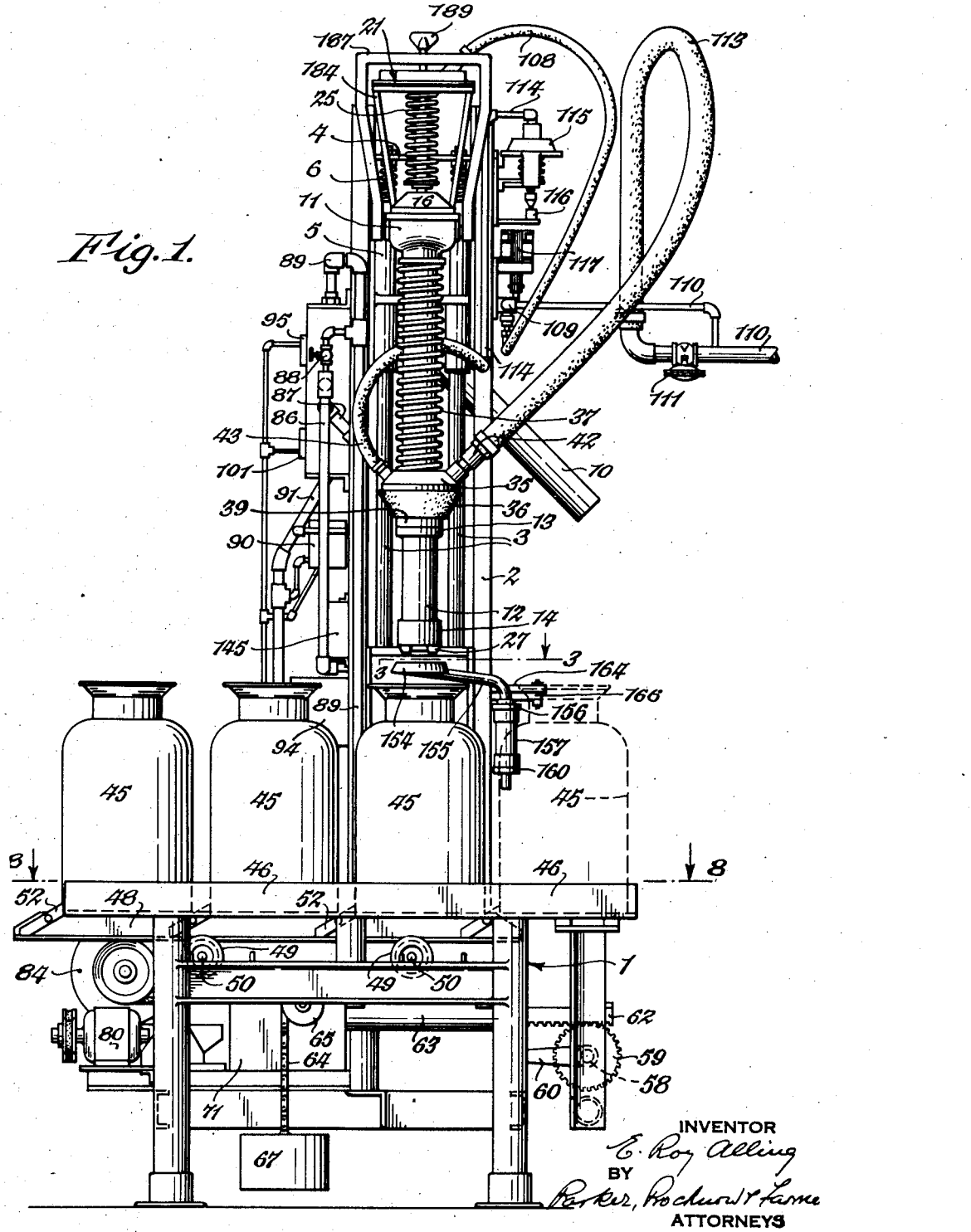
Fig. 1 is a front elevation of a hydraulically controlled apparatus for emptying containers, such as the milk cans used in the dairy industry, in accordance with this invention.

Fig. 23 is a sectional elevation through the same, the section being taken approximately along the line 23—23 of Fig. 22; and Fig. 24 is an elevation, partly in section, of a system in which the emptying mechanism may be a part, and by which the cans filled with milk may be emptied while in upright position, inverted, cleansed and dried, again up-ended into upright positions, the covers replaced, and the can and replaced cover discharged together in upright positions.

In the embodiment of the invention illustrated in Figs. 1 to 18 inclusive, the apparatus is mounted in a suitable frame 1 having columns or posts 2 upstanding therefrom. A pair of guide rods or bars 3 are supported in upright position by a cross bar 4 (Figs. 1 and 5) connecting the upper ends of the posts 2, and to which the upper ends of the guide rods are secured. The lower ends of the guide rods are connected to the frame in any suitable manner. A cross head or block 5 (Figs. 1, 5 and 18) is mounted to slide vertically on the guide rods 3, and springs 6 on the upper ends of the guide rods 3 resist any tendency of the cross head 5 to overrun at its upper limit of movement. An operating rod 7 (Figs. 5, 15 and 18) depends from the cross head or block 5 and extends into a ram cylinder 8 where it terminates in a piston 9 that reciprocates endwise in the cylinder 8. Thus by varying the effective pressures on opposite faces of the piston 9, the elevation and lowering of cross head 5 may be caused. The mechanism for producing different effective pressures on the opposite face of the piston 9 will be explained hereinafter.

Mounted upon the cross head 5 is a spout or pipe 10 (Figs. 1, 2, 5 and 15). This spout 10 is disposed in an inclined position, and at its upper end it is connected through a collecting head 11 to the upper end of an upright pipe or conduit 12. The pipe 12, head 11 and spout or pipe 10 together form an emptying conduit with the pipe 12 constituting a depending vertical leg or conduit, and the spout or pipe 10 a laterally extending section thereof. The lower end of the pipe 10 is disposed to discharge the contents of the containers into any suitable receptacle, which in the milk industry will usually be a weigh tank in which the milk and contents of the containers may be weighed and sampled. The pipe or conduit 12, intermediate of its ends, is provided with an external peripheral flange 13.

A sleeve 14 (Figs. 12 and 15) is slidingly confined on the lower end of the pipe or conduit 12, so as to have limited endwise movement thereon, and through gravity this sleeve 14 will normally descend to its lowermost extent, and if it engages the bottom of a container before the tube 12 has been lowered by the cross head 5 to the full extent, the sleeve 14 may remain in contact with the bottom of the container and the remainder of the conduit 12 will be free to descend further to a limited extent. A tube or pipe 15 (Figs. 12 and 15) is disposed within the conduit or pipe 12, so as to extend from end to end thereof and upwardly into the collecting head 11. Extending downwardly through the removable top 16 of the collecting head 11 is an operating rod 17, and the lower end of this rod 17 is removably connected, such as by a pin 18, to a fin 19 that extends across the open upper end of the pipe or tube 15. The upper end of the rod 17 is connected to the diaphragm 20 of an air motor 21.

The rod 17 is guided through the top 16 of the collecting head 11 by means of a tube 22 which is secured in the top 16 so as to extend upwardly therefrom along the rod 17 for some distance, and this tube or pipe 22 carries an adjustable nut 23 thereon which, with a washer 24 resting thereon, acts as one abutment for a helical coil spring 25, the other end of which spring abuts against the lower face of the diaphragm 20 of the air motor 21. Thus the spring 25 normally forces the diaphragm 20 upwardly, but when fluid pressure is exerted on the diaphragm, the diaphragm and the rod 17 will be forced downwardly into the collecting head 11, and by reason of the connection to the tube 15 the latter will be shifted endwise in the pipe or conduit 12 to a limited extent.

Slidably mounted on the lower end of the tube 15 is a sleeve 26, which forms a telescopic extension of the lower end of the pipe 15, and this sleeve 26 is connected by one or more fins 27 (Figs. 15, 16 and 17) rigidly to the sleeve 14 so that the sleeves 26 and 14 together form a rigid unit which is telescopically connected to the lower end of the pipe 12 and also the lower end of the tube or pipe 15. The sleeve 14 forms a continuation of the lower end of the pipe 12, and the sleeve 26 forms a similar extension for the pipe 15. It will be noted that the sleeve 26 extends at its open lower end slightly below the open lower end of the sleeve 14 for a reason which will appear hereinafter.

The fins 27 extend slightly below the lower end of the sleeve 26, so that by engaging with the bottom of the container the lower end of the sleeve 26 will be just slightly spaced above the bottom of the container, and thus the contents of the container may pass into the sleeve 26 through the open lower end thereof, even though the sleeve 26 may be resting through the fins 27 directly upon the bottom of the container.

The collecting head 11 as a chamber 28 (Figs. 12, 14 and 15) therein which opens into the pipe or spout 10 and the pipe 12 opens upwardly through the bottom of this chamber. A sleeve 29 telescopes slidingly within the passage through the bottom of the collecting head 11 which forms the connection to the pipe 12, so that the sleeve 29 forms a telescopic extension of the passage of the pipe 12. Fins 30 (Figs. 12 and 14) connect the sleeve 29 to the tube 15, so that the sleeve 29 moves vertically with the tube 15 to an extent permitted by its telescopic travel in the collecting head 11. A deflector head 31 (Figs. 12 and 13) is disposed in the upper part of the chamber 28 of the collecting head, and is supported rigidly in this position by lugs 32 which extend from the periphery of the deflector head 31 to a ring 33 which is confined in a recess in the upper edge of the collecting head by the removable top plate 16. This deflector head 31 is provided with a passage 34 through which the rod 17 passes loosely, and the lower end of this passage 34 telescopingly and slidably receives the upper end of the tube 15. The tube 15 is thus guided for vertical movement at its upper end by the deflector head 31 and at its lower end by the sleeve 26.

It will be noted that the deflector head 31 is spaced largely around its periphery from the top 16 and the outer wall of the chamber 28, and thus liquids or other contents of the containers, which may pass up through the tube 15 will, when it reaches the top of the chamber 28, be able to pass the periphery of the deflector head 31 down into the lower port of the chamber 28 and thus out through the spout or pipe 10, notwithstanding that the tube 15 may have been shifted endwise to some extent by the diaphragm 20 or spring 25. The upper end of the sleeve 29 engages or seats against the under face of the deflector head 31 when the tube 15 is shifted upwardly by the diaphragm 20 and spring 25 (as shown clearly in Fig. 15), and when in that position it closes communication between the passage of the pipe 12 and the chamber 28 of the collecting or valve head 11. When the tube 15 is lowered, such as into the position shown in Fig. 12, the sleeve 29 will descend away from the deflector head 31 and thus establish communication between the passage or pipe 12 and the chamber 28. The sleeve 29 is, therefore, a shiftable valve element which controls the passage through the pipe 12, outside of the tube 15, and may be closed or opened merely by shifting the tube 15 endwise to a limited extent, such as by the diaphragm 20 of the air motor 21. During such shifting movements of the tube 15, the sleeve 26 will remain resting on the bottom of the container since the lower end of the tube 15 is free to slide vertically in the sleeve 26.

Slidingly mounted on the exterior of the depending leg or conduit pipe 12 is a stopper or sealing head 35 (Figs. 12 to 16) having thereon a resilient downwardly tapered sealing gasket 36 which is engageable in the upper open mouth of the containers. A helical compression spring 37 is provided on the conduit or pipe 12 and abuts at one end upon a flange 38 on the lower end of the collector head 11 where the pipe 12 screws into the same. The other end of the spring 37 engages with the upper end of the stopper or head 35, so as to urge the latter downwardly. Normally, the spring 37 urges the stopper 35 against the flange 13 on the pipe 12 (as shown in Fig. 1) but when the conduit pipe 12 is lowered into a container (as shown in Fig. 12) the stopper 35, when it engages with the mouth of the container, will be held against further downward movement while the pipe 12 continues to descend to the bottom of the container, during which action the spring 37 is further compressed. The body of the stopper 35 extends below the sealing gasket 36 and terminates in a shoulder 39 which abuts against the flange 13 when the conduit pipe 12 is elevated out of the container.

The interior of the stopper or head 35 is provided with a chamber 40, and a plurality of arcuate passages 41 extend from this chamber 40 downwardly through the lower end of the stopper and open through the shoulder 39. When the stopper engages against the flange 13, the shoulder 39 will abut the flange 13 and the latter will close the passages 41 at their lower ends. A pipe or tube 42 (Fig. 12) is connected to the stopper 35 so as to communicate with the chamber 40 and supply thereto an actuating fluid under pressure, such as compressed air. Another tube 43, (Fig. 12) is also connected to the head 35 at a distance from the tube 42, and the head is provided with a passage 44 (Figs. 12 and 16) which leads from the connection to the tube 43 and opens downwardly through a shoulder 39a in a different plane than the shoulder 39, so that the passage 44 extends from face to face of the stopper or sealing head 35, and is separate from the chamber 40 and passage 41. When the stopper or sealing head 35 abuts against the flange 13 on the pipe 12, the lower end of passage 44 will be free of any pressure in chamber 40.

The receptacles or cans 45 are fed by any suitable means in a prescribed path in succession beneath the depending conduit or pipe 12, and the pipes 10 and 12 with the collecting head 11, either are lowered to disposed pipe 12 in the cans in succession to perform an emptying operation, and then elevated out of the cans through actuation of the rod 7 and cross head 5, or the cans are elevated over the pipes 10 and 12 and then lowered at the conclusion of the emptying operation. In the illustrated example, the pipes 10 and 12 are lowered into the cans, but it will be understood that the movement is a relative one. One example of means for feeding the cans beneath the depending pipe 12 will now be described. On the frame 1, I provide a guide or trackway formed of parallel angle strips 46 (Figs. 1, 2, 5, 8, 10, 11, 12 and 15) which are spaced apart, and the horizontal legs or arms of these angle strips, which extend towards one another in approximately the same plane, together form the supporting surface along which the cans 45 may be slid. The upstanding arms or legs of the angles confine the cans against lateral displacement while permitting movement along the angles.

A channel bar 47 may also be disposed between the angles 46, with its upper edge or face in the same plane as the horizontal arms of the angle strips 46, so as to form a support for the cans in between the angle strips and prevent the cans from tipping during the feeding operation. Dog bars 48, which also may be angle bars, are disposed in the spaces between the channel strip 47 and angle strips 46, so as to extend parallel with the same but slightly below the common surface of the strips 46 and 47 on which the cans slide. These dog bars 48 ride upon flanged wheels 49 of roller axles 50 (Figs. 1, 2, 9 and 11), and the latter are arranged to roll upon supports 51 provided on suitable parts of the frame 1 (Fig. 11). The ends of the supports 51 are upstanding or bent upwardly to limit the rolling travel of the axles 50. Each dog bar has pivoted thereto a plurality of spaced dogs 52, and these dogs have corresponding ends weighted so as to yieldingly project the other ends upwardly above the sliding surface on which the cans are supported, as shown for example in Fig. 1.

The dogs 52, at their weighted ends, rest upon the horizontal flanges of the dog bars to limit the maximum extent that their free ends are projected upwardly into driving engagement with the cans, and yet when the dog bars are moved in one direction, the upwardly projecting ends of the dogs 52 will ride idly under the cans, during which they lift the weighted ends. As soon as they clear the cans, the dogs will again automatically assume the upwardly projecting, driving positions shown in Fig. 1, for example. The dogs 52 are spaced apart along the dog bars a distance corresponding to the desired spacing of the cans on the trackway or guideway. The dog bars are connected together at intervals along their length by strips 53, so that the dog bars together form a reciprocating, can feeding unit. At one end the dog bars are also connected by a bar 54 (Fig. 10), an arm 55 depends from this bar near one end of the frame 1. This depending arm 55 (Figs. 9 and 10) is provided with a vertically elongated slot 56, and a bearing block 57 is reciprocatingly confined in the slot 56.

Rotatably mounted in the frame 1 is a shaft 58, and this shaft 58 mounts thereon a gear 59 and a crank arm 60. The arm 60 is connected by a pivot pin 61 to the sliding block 57 in the slot 56. When the arm 60 is approximately horizontal, the sliding block 57 is approximately at the lower end of the slot 56 (as shown in Fig. 9) and when the shaft 58 is rotated through a half revolution into the position shown by dotted lines in Fig. 9, it will shift the depending arm 55 from the full to the dotted line position in Fig. 9. Because of the fact that crank arm 60 is approximately at the dead center at its limits of movement, the starting and stopping of the dog bars as they are moved through the depending arm 55 will be easy and gradual, but with relatively rapid travel in between the limits of movement, which reduces the tendency to slop by any liquids in the cans. The gear 59 meshes with and is driven by a rack bar 62 which forms an extension of one end of the piston of a ram 63, mounted in a horizontal position in the frame 1.

When fluid pressure is supplied to the ram 63 it will force the rack bar 62 to the right in Fig. 9, and thus cause a shifting of the crank arm 60 from the full to the dotted line position, and consequently a movement of the dog bars 48 through a distance slightly greater than the desired spacing between the cans, that is a distance slightly greater than the spacing between the dogs 52 along the dog bars. A chain or cable 64 running over a guide pulley 65 is connected at one end, as at 66, to the rack bar 62 (Fig. 9) and at its other end to a weight 67. When the rack bar 62 is moved in one direction by the ram 63, it elevates the weight 67 and then when the actuating fluid is released from the ram the weight 67 returns the rack 62 and through it the dog bars and dogs to their initial positions shown in full lines in Figs. 8 and 9.

The ram 63 is supplied with actuating fluid through a pipe 68 (Figs. 9 and 18) and the pipe 68 extends to a hydraulic, controlling valve 69 of well known and common construction. A pipe 70 leads from the valve 69 to a reservoir or sump 71 for the hydraulic actuating liquid, and a pipe 72 leads from the valve 69 to the output side of the pump 73 which is preferably of the variable delivery type that sets itself to approximately no delivery when a selected pressure is encountered in the output side of the pump. The valve 69 is provided with a valve element 74, having a cam roller 75 on its outer end which rides upon a cam 76 mounted for rotation with a shaft 77. The cam 76 will thus cam the valve element 74 into the valve 69 intermittently and in doing so will connect the pipes 70 and 72 alternately with the pipe 68. When the pipe 72 is connected to the pipe 68 through the valve 69, the hydraulic fluid from the pump 73 will be delivered to the ram 63 and cause a forward movement of the dog bars.

When the pipe 70 is connected to the pipe 68 through the valve 69, the ram 63 will be connected to exhaust so that the operating liquid previously delivered may escape back to the reservoir 71. The intake side of the pump 73 is connected by a pipe 78 to the reservoir 71. Pumps of the variable delivery type are well known in the hydraulic art, also the type of valve 69 which is illustrated only diagrammatically. They are articles available in the open market, and therefore a detailed description has been omitted. The shaft 77 is driven through a speed reduction gearing 79 from a motor 80 which is supplied with current through line wires 81 controlled by switch 82. The pipe 72 may preferably have a metering control valve 83 in series therein, by which the rate of advancement of the dog bars may be regulated through regulation of the rate of delivery of actuating liquid to the ram 63.

The motor 80 is of the constant speed type, such as a synchronous, alternating current motor of a type in common use. The line wires 81 also supply current to a motor 84 (Figs. 5, 8 and 18) which through a belt 85 drives the variable delivery pump 73. Since the motor 80 operates at a constant speed, and there is a definite driving connection to the cam 76, it follows that there will be reciprocations of the dog bars, and therefore intermittent movements of the cans, at regular time intervals, and consequently the cans will be fed at regular time intervals in succession beneath the emptying pipe for a selected interval of time determined by the rate of rotation of the cam 76.

Any suitable means may be employed for lowering the emptying pipe or conduit 12 into the cans and then elevating it therefrom in proper timed relation to the step by step movements of the cans, and in Figs. 1 to 18 I have illustrated, by way of example, hydraulically actuated means for controlling the lowering and elevation of the emptying conduit or pipe 12. The rod 7 which is connected to and actuates the cross head 5 that carries the emptying pipe or conduit, as previously explained extends into a cylinder 8 of a hydraulic ram and terminates in a piston 9 within the cylinder 8. A pipe 86 connected to the upper end of the cylinder 8 supplies actuating liquid to one end of the cylinder 8, and a pipe 87 is connected to the other or lower end of the cylinder 8 to supply actuating liquid thereto. The pipe 86 extends through a needle valve 88 (Fig. 18) to a supply pipe 89 which leads to the output side of the pump 73. The pipe 87 is connected through a metering valve 90 to a pipe 91 which leads to a controlling valve 92. The valve 92 is a well known controlling device for hydraulic rams, is available in the open market, and its valve element 93 is actuated between its limits of movement by a solenoid 94.

Connected in parallel across the needle valve 88 is a rapid traverse and check valve 95 known as a "Vickers" valve and available in the open market under that name. Such valves have branch parallel passages 96 and 97 (Fig. 18). In the passage 96 is a check valve element which opens to pass liquid freely in the direction shown by the arrow in Fig. 18, and closes automatically to prevent reverse flow. Flow through the other passage 97 is controlled by a reciprocating valve element 98 having a cam roller 99 at its free end, and which is adapted to ride upon a cam 100 carried by the cross head 5. A spring within the housing of valve 95 normally urges the valve element outwardly and into the path of the cam 100. The valve 95 is so disposed that the roller 99 thereof will be engaged and operated in one direction by the cam 100, as the cross head 5 just about reaches its upper limit of movement (as shown in Fig. 18). When the roller 95 rides on the cam 100 (Fig. 18) it closes or restricts the passage 97 through the valve 95, and when the cam 100 releases the roller 99 the valve element 98 opens the passage 97.

A valve 101 similar to the valve 95 is connected in parallel across the metering valve 90. This valve 101 also has branch passages 102 and 103 in parallel to one another and the passage 102 is provided with a one-way check valve passing liquid freely in the direction of the arrow in Fig. 18 and automatically closing to prevent reverse flow. The passage 103 is controlled by the reciprocating valve element 104 having a roller 105 on its outer end, which is adapted to be engaged and operated by a cam 106 also carried by the cross head 5. When the valve element 104 is forced inwardly by the cam 106 it restricts or shuts off communication in the passage 103. The valve 92 operates, when the valve element 93 thereof is in one position, to connect the outlet side of pump 73 and also pipe 89 to the pipe 91, and when in its other position to connect the pipe 91 to a pipe 107 which leads to the pipe 70 that conveys the actuating liquid back to the reservoir 71. It will be noted that the pump 73 is connected at its outlet side at all times to the pipe 89, and thus through the pipe 86 leading to the upper end of the cylinder 8 it tends to force the piston 9 downwardly at all times. The pipe 91 is connected alternately to the outlet side of pump 73 through pipe 89 and to the exhaust pipe 107. Because of the fact that the pipe 86 is connected to the upper end of the cylinder 8, where the rod 7 extends from the piston 9 exteriorly of the cylinder 8, it follows that the total pressure area on the upper face of the piston 9 will be reduced by the area occupied by the rod 7, so as to be considerably below the total pressure area available on the under face of the piston 9. Therefore, even if the output side of the pump is connected at the same time to both ends of the cylinder 8, the piston 9 will be forced upwardly because the total pressure on the bottom of the piston will be greater because the pressure area is greater and the pressure per unit area is the same. When the pipe 91 is connected to the exhaust pipe 107, then the pressure on the lower face of the piston 9 will be released and the pressure on the upper end of the piston 9 will force the piston downwardly and lower the cross head 5.

As previously explained, the valve element 93 is actuated by the solenoid or electromagnetic operating device 94, which, when operated, pulls outwardly on the valve element 93 and serves to connect the pipe 107 to the pipe 91 and cause a downward actuation of the piston 9 and cross head 5. When the operating device 94 is deenergized, it automatically shifts the valve element 93 into a position to connect the outlet side of the pump 73 through pipe 89 to pipe 91 and at the same time to disconnect pipe 91 from the exhaust pipe 107, whereupon the piston 9 will be forced upwardly to raise the cross head 5. Valves 92 of this type are common in the hydraulic art, and have not been illustrated and described in detail since they are available in the open market.

The casing 21 for the diaphragm 20 at the top of the emptying conduit is connected by a flexible hose or pipe 108 (Figs. 1, 2, 15 and 18) to a valve or device 109 (Fig. 18), and this valve device is also connected by a pipe 110 to a source of compressed air or other actuating fluid under pressure. The pipe 110 is also connected through a pressure reducing device 111 and pipe 112 to the tube or pipe 42 leading to the stopper or sealing head 35. The pipe 112 may include in its connection to the tube 42, a flexible hose 113 which enables the head 35 to move upwardly and downwardly while remaining connected to the pipe 112. The tube 43 is connected by a pipe 114 having a flexible hose or section therein to the air motor 115 of a pressure responsive or micro-switch 116. The air motor 115 is similar to the air motor 21 in Figs. 12 and 15, but is very sensitive to pressure fluctuations. When air or fluid under pressure is supplied to the motor 115 through the pipe 114, it depresses the diaphragm therein and closes the switch 116. When the pressure on the diaphragm in the motor 115 falls below that determined by the usual opposing or regulating spring therein, it is operative to open the switch 116.

The valve 109 is operated between its two positions by an operating solenoid 117, and when in one position it connects the pipe 110 to the flexible hose 108, and when in its other position it interrupts this connection and vents the tube 108. The solenoid 117 is connected in series in line wires 118 and 119 which are connected to the line wires 81 controlled by the switch 82, and the circuit between the line wires 118 and 119 may be closed by the switch 116. Thus, when the switch 116 is closed it completes a circuit through the solenoid 117 and causes an actuation of the valve 109. Wires 120 and 121 are connected to the wires 118 and 119 respectively, in parallel across the switch 116, and these wires 120 and 121 lead to a normally open switch 122 which is normally urged into open position but operated to closed position through an interponent lever 122a which is actuated, during descent of the cross head 5, by a cam 123 on the cross head. A spring 122b (Fig. 18) urges the interponent into the full line position shown in Fig. 18 from displacement in either direction of pivotal movement from that position.

The switch 122 and its operating cam 123 are so positioned with respect to one another and to the cross head 5 that the switch 122 will be open while the cross head 5 is in its elevated position and for some slight distance below the elevated position, after which it will be closed until the sealing head or stopper 35 has engaged the mouth of the container or can. Thus the switch 122 is connected in parallel to the switch 116, and each of them is operative to complete the circuit through the solenoid 117 and cause delivery of compressed air to motor 21 and a lowering of valve element 29 to open the main passage of conduit 12.

The wire 118 is connected by a branch wire 124 to a front contact 125 of a relay 126. The winding 127 of this relay is connected at one end to the contact 125 and at its other end by wire 128 to a front contact 129 of a time delay relay 130. The other front contact 131 of the time delay relay 130 is connected by a wire 132 to another front contact 133 of the relay 126. The other front contact 134 of the relay 126, which cooperates with the front contact 133, is connected by a wire 135 to a switch 137 and by wire 136 to the other line wire 119. The other contact of switch 137 is connected by a wire 138 to the front contact 129 of the time delay relay 130. The movable switch element 139 of switch 137 is urged continuously but yieldingly into open position and carries a roller 140 which is in a position to be operated to move element 139 into closed circuit position by a cam 141 on one of the dog bars 48 at approximately the time that the dog bar completes its movement in feeding a can into a position beneath the emptying conduit pipe 12.

One end of the winding of time delay relay 130 is connected by a wire 142 to front contact 143 which cooperates with the front contact 125 of the relay 126. The other end of the winding of relay 130 is connected by a wire 144 to a normally closed switch 145, the movable element 146 of which is yieldingly urged into closed position, but is disposed for operation into open position by a cam 147 also carried by the cross head 5 when the cross head 5 approximately reaches its lower-most position which will be when the emptying conduit pipe 12 has been about fully lowered into a container. The other side of the switch 145 is connected by a wire 148 to a front contact 149 of the relay 126, and this contact 149 is also connected to the wire 136. The opposite and cooperating contact 150 of the relay 126 is connected by a wire 151 to the solenoid 94, and the other side of the solenoid is connected by a wire 152 and a resistance 153 in series therewith to the wire 142.

Where some liquids are emptied from cans, as in the milk industry, it is important to save the drip from the conduit 12 while it is elevated out of a can, and for this purpose a drip saving receptacle 154 (Figs. 1, 3 and 4) is mounted for movement into and out of a position immediately below the open lower end of the conduit pipe 12 when the latter is in elevated position above the can path. This receptacle is mounted on a tubular arm 155 which extends first laterally from the receptacle 154, and then at its free end extends downwardly and is slidingly received in a sleeve 156. The sleeve 156 is rotatably mounted in a bearing 157 provided on one of the posts 2 of the frame. The arm 155 is provided with a collar 158 which rests upon the upper end of the sleeve 156 and limits the downward movement of the arm 155 in the sleeve, and a pin 159 carried by the upper end of the sleeve 156 is received in an aperture in the flange 158, so that while the arm 155 may be removed from the sleeve 156 for cleansing by lifting it vertically therefrom, the arm and sleeve will normally rotate together when the arm is lowered into the sleeve 156.

A collar 160 may be removably mounted on the lower end of the sleeve 156 to hold the bearing sleeve down and against removal from the bearing 157 whenever the drip receptacle and its arm are lifted out of the sleeve 156. The sleeve 156 is provided with arms 161 and 162 (Fig. 3) extending laterally therefrom. A spring 163 connects the arm 162 to a suitable part of the frame, and urges the arm 155 to swing in a direction to place the drip receptacle 154 immediately below the emptying conduit or pipe 12. Also mounted on one of the members of the frame, such as a post 2, is a guide 164 (Figs. 3, 6 and 7). This guide 164 has a slot 165 which extends generally in the direction of swinging movement of the arm 161 of the sleeve 156 of the drip having device. A link 166 is disposed immediately below the guide 164 and at its free end this link 166 carries a pair of freely rotatable, superposed rollers 167 and 168 mounted on a common bearing pin. The upper roller 168 is disposed within the slot 165 of the guide 164, and a washer 169 is confined on the common bearing pin for the roller 168, such as by a screw 170.

The washer 169 is of greater diameter than the width of the slot 165, so that it supports one end of the link 166 and guides the roller 168 along the slot 165. The lower roller 167 is disposed in the path of movement of the free end of the arm 161. The other end of the link 166 is pivotally connected by a pin 171 to the upper end of a lever 172, which is pivoted at 173 to a post 2 of the frame. The lever 172 extends downwardly and at its lower end carries a laterally extending pin 174 that projects into the path of a lug 175 (Figs. 4, 8, 9 and 11) provided on one of the reciprocating dog bars 48. The lever 172 (as shown in Figs. 3 and 4) has its two arms separated from one another and connected by a shaft at the pivot, the shaft part being rotatably mounted in a bearing 176 on a post 2 of the frame. A spring 172a urges lever 172 into the full line position shown in Fig. 4.

A latch 177 (Figs. 6 and 7) is pivoted at 178 so as to swing vertically and shift its latching nose into and out of the path of movement of the arm 161, and confine the arm 161 at one limit of its movement, which is shown by the full lines in Figs. 3, 6 and 7. The free end of the latch 177 is connected by a pivot pin 179 to one end of a link 180, the other end of this link being pivotally connected to a lever 181, which in turn is pivoted at 182 to one of the frame posts 2. The free end of the lever 181 is disposed in the path of travel of a cam or lug 183 provided on the cross head 5 and having a pivoted abutment 183a which pivots freely in an upward direction but is held by a stop from movement in a downward direction past a straight out position, so that just before the cross head 5 reaches its upper limit of travel, the lug abutment 183a will engage beneath the lever 181 and cam it upwardly sufficiently to lift the link 180 and thus lift the latch 177 and release the arm 161. Lug 183a then releases the lever 181 by camming it aside before the cross head 5 approximately reaches the upper limit of its travel, and drops back into straight out position. When the cross head descends, the abutment 183a will be cammed idly in an upward direction to clear the lever 181.

The operation of the embodiment of the invention shown in Figs. 1 to 18 will now be described, with particular reference to Fig. 18 in which the connections are illustrated somewhat schematically and diagrammatically. Assuming that the emptying conduit 12 is in its elevated position above the cans (as shown in Fig. 1, for example) the cross head will be in its upper limit of movement (also shown in Fig. 18) and the drip saving receptacle 154 will be disposed beneath the lower end of the emptying conduit 12 (Fig. 1). Immediately after this, the cam 76 (Fig. 9) which is driven by the motor 80 will engage the roller 75 of the valve element 74 of valve 69, and force the valve element 74 into a position to connect the pipe 72 to the pipe 68. This will cause the delivery of a liquid under pressure from the pump 73 to the ram cylinder 63. This liquid will force the rack piston 62 outwardly, and the latter, which is confined in mesh with the gear 59 by the guide plate 62a, will rotate the gear 59 and thus shift the arm 60 from the position shown in full lines in Fig. 9 to the position shown in dotted lines in Fig. 9, that is, through a half revolution.

During this movement the arm 60, through the sliding bar 57 and the depending arm 55 of the dog bars, moves the dog bars from the full line position in Fig. 9 to the right to the extent shown by the dotted lines at the right of Fig. 9. In doing so, the dogs 52 push the cans along the guideway one step, which is the distance between successive cans, thus pushing one can from beneath the emptying conduit 12 and pushing the next successive can into position beneath the conduit 12. During this operation the chain 64 was pulled to elevate the weight 67, and as soon as the high zone of cam 76 has cleared the roller 75, the pipe 68 is vented by connecting it to the pipe 70, whereupon the liquid which has been delivered to the cylinder ram 63 will escape back through the pipes 68 and 70 to the reservoir 71. During this escape the weight 67 returns the rack 62 to its initial position, shown in full lines in Fig. 9, and in doing so will shift the dog bars back to their initial positions shown in full lines in Figs. 8 and 9.

During the return movement of the dog bars, the dogs 52 will ride under the next successive cans until they clear the cans and then they will automatically move upwardly into driving positions for the next cans. As soon as the dog bars return to their initial positions, to the left in Fig. 9, where they are slightly past the respective cans, they will remain there until the cam 76 again comes around and operates the valve 69 to initiate another feeding movement of the cans.

As the dog bars moved forwardly in feeding the cans along the guideway, the lug 141 (Fig. 18) on one of the dog bars engaged the roller 140 just as the dog bars approximately completed their can feeding movement, and rocked the switch lever 139 to close the switch 137. During the same can feeding movement of the dog bars, the lug 175 thereon (Figs. 3 and 4) engaged and operated the cam 74 of lever 172 and thus rocked the lever 172 in a direction to pull the link 166 to the left in Figs. 6 and 7. This shifted the roller 167 against the arm 161 so as to rock the sleeve 156 and the drip saver receptacle 154 from the dotted line position to the full line position in Fig. 3, and carry this receptacle from beneath the conduit 12. The lug 175 completes this movement of lever 172 at approximately the limit of the can feeding movement by the dog bars. The cam 76 (as shown particularly in Fig. 9) has a dwell on its high zone, so that when it operates the valve 69 to cause a feeding movement of the cans it will keep the valve 69 open for a substantial interval of time, which is more than enough to complete a forward feeding movement of the cans. Just before the completion of that feeding stroke, lug 175 will engage pin 174 and operate lever 172 and through it and roller 167 will operate arm 161 from the dotted line to the full line position shown in Fig. 7 and thus the drip saving receptacle 154 is moved laterally out of a position beneath the emptying conduit, and latched at the full line position of Fig. 3 by member 177 until released by lug 183 on cross head 5.

The closing of the switch 137 will initiate a downward movement or lowering of the conduit 12 in a manner which will be described presently, and this downward movement will start before the cam 76 has released the valve 69 and the dog bars have started their return stroke to any substantial extent. When the dog bars return to initial positions after the feeding operation of the cans, the lug 175 will release the lever 172 and the latter will then be free to return to the full line position shown in Figs. 3 and 4 under the action of the spring 172a.

When the lug 141 on the dog bar operated the switch 137 into closed position at the end of its forward stroke, or the can feeding movement of the dog bars, as shown in Fig. 18, the switch 137 completed a circuit as follows:—from the switch 82 and one of the main line wires through branch wires 136 and 135, switch 137, wires 138 and 128, winding 127 of the relay 126, and wire 124 back to the other line wire. This causes an operation of the relay 126 to the left in Fig. 18, with resultant closing of the three pairs of front contacts. At this time the cross head 5 is in its elevated position, and therefore the normally closed switch 145 is in closed position. A circuit will therefore be immediately established from one of the line wires to wire 124, front contacts 125 and 143, wire 142, time delay relay 130, wire 144, switch 145, and wires 146 and 136 back to the other line wire. This energizes the time delay 130, with immediate closing of its front contacts 129 and 131.

This time delay relay closes another circuit (Fig. 18) as follows:—from branch wire 136, front contacts 133 and 134, wire 132, front contacts 129 and 131 of the time delay relay, wire 128, winding 127, and branch wire 124, thus making a holding circuit for the winding 127 to hold it in energized condition even though the switch 137 may be immediately broken, such as by the backward movement of the dog bars that carries the cam 141 out of operating engagement with the switch 137. When the relay 126 was energized it also completed another circuit as follows:—from branch wire 136, front contacts 149 and 150, wire 151, valve solenoid 94, wire 152, resistance 153, wire 142, front contacts 143 and 125 of relay 126 and wire 24 back to the other line wire. This causes an energization of the solenoid 94 and an operation of the valve element 93.

Before the energization of the solenoid 94, which was while the cross head 5 was in its elevated position, the valve element 93 was in a position in which the pump 73 was delivering liquid through the pipes 91 and 87 to the lower end of the cylinder 8. This kept the cross head 5 in its elevated position. Upon operation of the valve element 93 following energization of the solenoid 94, the connection from the pump to the pipe 91 will be broken and the pipe 91 will be vented to the exhaust pipe 107 leading to the reservoir 71. Since there is always pressure from the pump on the upper end of the piston 9, when the liquid acting on the lower end of the cylinder 8 has been released, the pressure on the lower end of the piston 9 will fall, and the piston 9 will be forced downwardly at a rate determined by the rate of escape of the liquid from the lower end of cylinder 8.

The liquid from the pump 73 will pass through the pipe 89, and then part of it will pass through the needle valve 88 into the pipe 86, and the remainder will pass through the check valve passage 96 in the valve 95 to the pipe 86, and since this is a check valve passing liquid freely in the direction of the arrow (Fig. 18) the liquid may pass through the check valve to pipe 86 without material opposition. It will be understood that at this time the cross head 5 is in its upper position, and the cam 100 has caused a closing of the branch passage 97 of valve 95. Since the check passage 96 may open freely, however, there is no material resistance to flow from the pump to the upper end of cylinder 8.

The liquid from the lower end of cylinder 8 will escape through pipe 87, and part of it will pass through the metering valve 90 to the pipe 91 and the remainder will pass through the valve 101. Since the check passage 102 opens freely only in the direction of the arrow (Fig. 18) the check in the passage 102 will remain closed, and the remainder of the escaping liquid will have to pass through the passage 103, but since the cross head 5 with its cam 106 is now in its elevated position, free of the valve element 104, the passage 103 will be fully open and therefore rapid escape of the liquid from the cylinder 8 will be possible. This insures a rapid initial downward movement of the cross head 5 and consequently rapid lowering of the emptying conduit 12 towards the container, but the engagement of the cam 106 with roller 105 causes operation of valve element 104 to slow down this descent, as the conduit 12 enters the container, sufficiently to prevent slopping over of the milk or contents of the container.

When the sealing head or stopper 35 engages in the mouth of the container (as shown in Figs. 2 and 12, for example) the tapered, resilient gasket 36 will seal the connection to the mouth of the can or container and hold the head 35 back against the action of the spring 37. As the cross head 5 continues to descend, it will lower the conduit 12 into the can until the fins 27 at its lower end rest upon the bottom of the can, whereupon the sleeves 26 and 14 will slide vertically on the conduit 12 slightly until the conduit 12 completes its descending movement. During this descent of the cross head 5, the movement will be rapid until the lower end of conduit 12 nearly enters the liquid in the container, whereupon the cam 106 will engage the roller 105 of valve element 104 and will restrict the passage 103 either fully or partially, and thus by cutting down the rate of the escape of the liquid from the cylinder 8 will retard the downward travel of the cross head. The retarding action may increase with the downward movement, because the cam 106 may have successive portions causing increasingly greater restriction of the passage 103. Further and more accurate regulation of the descent of conduit 12 is also possible by varying the meter valve 90.

As the cross head 5 travels downwardly the switch 122 is closed by the cam 123 and remains closed until the sealing head or stopper 35 has engaged the can mouth, whereupon the cam 123 clears the switch 122 and releases it, which then opens automatically, it being a normally open switch. This opens the circuit through the solenoid 117 and thus operates the valve 109. This will cut off the flow of compressed air from pipe 110 to tube 108, and vent the latter to atmosphere which causes a release of pressure on the diaphragm 20 in the air motor 21. The spring 25 then operates the diaphragm 20 upwardly to seat the sleeve 29 against the deflector head 31 and close the main passage through the conduit 12 to the spout 10. However, in the meantime the stopper 35 has engaged the mouth of the container, and continued descent of the conduit 12 carried the flange 13 away from the shoulder 39 and opened the passage from the chamber 40 into the can. Immediately, air under pressure from the pipe 110 passes through pipe 112, hose 113 and tube 42 into the container or can, and exerts a pressure on the contents of the can.

Some of this pressure was immediately passed through the passage 44 into the tube 43, and thence by pipe 114 to the air motor 115 of the micro-switch 116, and the pressure in the motor 115 caused the closing of the micro-switch 116 which completes a shunt circuit and continues energization of the solenoid 117 before cam 123 releases switch 122. This maintains valve 109 in its position which establishes the connection between pipe 110, tube 108 and the air motor 21, during which diaphragm 20 remains depressed and the sleeve or valve element 29 lowered. Thus the sleeve 29 will remain in open position as the conduit 12 descends. Since the air pressure in the can is greater than in the conduit 12, the liquid or other contents in the can will be forced outwardly through the conduit 12 including the tube 15 into the collecting head 11, and thence through the spout 10 into a suitable receptacle such as a weigh tank.

When the contents of the can have been forced out down to a level at the lower end of the sleeve 14, the rush of air into the conduit 12 which then occurs will lower the air pressure in the container slightly, and this fall in pressure is transmitted through the passage 44, tube 43 and pipe 114 to the air motor 115, which is a very sensitive air motor. This fall in pressure in motor 115 will cause an opening of the micro-switch 116, with immediate deenergization of the solenoid 117. Thereupon the valve 109 is operated to cut off communication between the pipe 110 and tube 108, and to vent the tube 108 which releases the pressure on diaphragm 20. Thereupon the spring 25 elevates the diaphragm 20 and through it the tube 15 to seat the sleeve or valve element 29 against the deflector head, thus closing the main or larger passage through the pipe or conduit 12.

The continuance of air pressure in the can or container, however, will force the small remaining liquid in the bottom of the can through the tube 15, up above the deflector head 31, and thence into the spout 10, it being understood that during such movement, the air and contents of the container will be rushing through the small tube 15 together, which restricted outlet will raise momentarily the reduced pressure in the can or container and cause a momentary opening of valve sleeve 29.

This produces a hunting movement of said valve sleeve 29, but the momentary opening of this sleeve 29 enables the air to force out whatever liquid may have been trapped in conduit 12 by the sudden initial closing of valve sleeve 29, and also any remaining liquid on the can bottom and in tube 15.

Thus one obtains a substantially complete emptying of the contents of the can. The rush of air beneath the sleeve 26 acts something like a vacuum cleaner to carry off, by mechanical entrainment, practically all of the liquid collecting on the bottom of the can. This flow of air will continue until the conduit 12 is again elevated in a manner which will now be described. The movement of air downwardly in the can as the emptying proceeds, apparently aids in the draining of liquid from the side and bottom walls of the can towards the inlet to pipe 15, with resulting lesser residuum in the can at the conclusion of the emptying operation.

When cross head 5 approximately reached its limit of downward movement, the hydraulic pressure on the piston from the variable delivery pump held it down, but at such completion of downward movement, the cam 147 on the cross head 5 engaged the lever 146 of the normally closed switch 145, and cammed it into open circuit position which opened the circuit through wires 144 and 146. This was the circuit through the time delay relay 130, and caused a deenergization of that relay. Thereupon the time delay relay began to count time in a manner well understood in devices of this type, and after a predetermined interval of time it opened the circuit between front contacts 129 and 131 which caused a deenergization of the winding 127 of relay 126. Thereupon the relay 126 opened all of the circuits across its front contacts, with resulting deenergization of the solenoid 94. Thereupon the valve element 93 was operated to interrupt the exhaust connection between pipes 91 and 107 and to connect the pipe 89 from the pump 73 again to the pipe 91, so as to restore the same pressure per unit area to both sides of the piston 9.

Since the pressure area on the under side of the piston 9 is greater, the piston then begins to rise and elevate the cross head 5 and through it the emptying conduit 12. During this elevation of the cross head 5, the liquid from the pump 73 will pass through pipe 91 and then divide, part of it passing through the metering valve 90 and the remainder through the freely opening check valve in passage 92, and thence through pipe 87 through the bottom of the cylinder 8. The liquid in the upper end of the cylinder will have to escape through the pipe 86, and part of this will pass through the metering valve 88, and the remainder will attempt to pass the check valve in passage 96 of the valve 95, but the latter will immediately close and force such liquid to pass instead through the passage 97. Since the cross head 5 is lowered, the cam 100 will have released the valve element 98 and thus there will be a free flow of escaping liquid through passage 97 until the cross head 5 approximately reaches its upward limit of movement, whereupon the cam 100 will again close or restrict the passage 97 and slow down the upward movement to that permitted by the escape of liquid through the metering valve 88 and the passage 97. Thus, we have an automatic slowing down of the cross head 5 as it approaches its upward limit of movement.

As the cross head 5 is elevated, the flange 13 on the conduit 12 will again engage with the stopper 35 and lift the sealing head 36 from the mouth of the can. The cam 123 will raise interponent lever 122a and pass idly thus avoiding operation of switch 122 on the upward stroke of the cross head. The engagement of the flange 13 with the under face of the stopper 35, before the stopper is lifted from the can, closes the passage 41 and thus prevents escape of the air through the pipe 112 and tube 42. The upward travel of the cross head 5, of course, released the switch 145 whereupon it automatically closed, but this did not occur until the relay winding 127 had been deenergized, and therefore the reclosing of switch 145 did not cause any reenergizing of the time delay relay 130, due to the fact that the circuit of that relay 130 was now opened at the contacts 125 and 143 of the relay 126.

Figures 15, 16, 17:
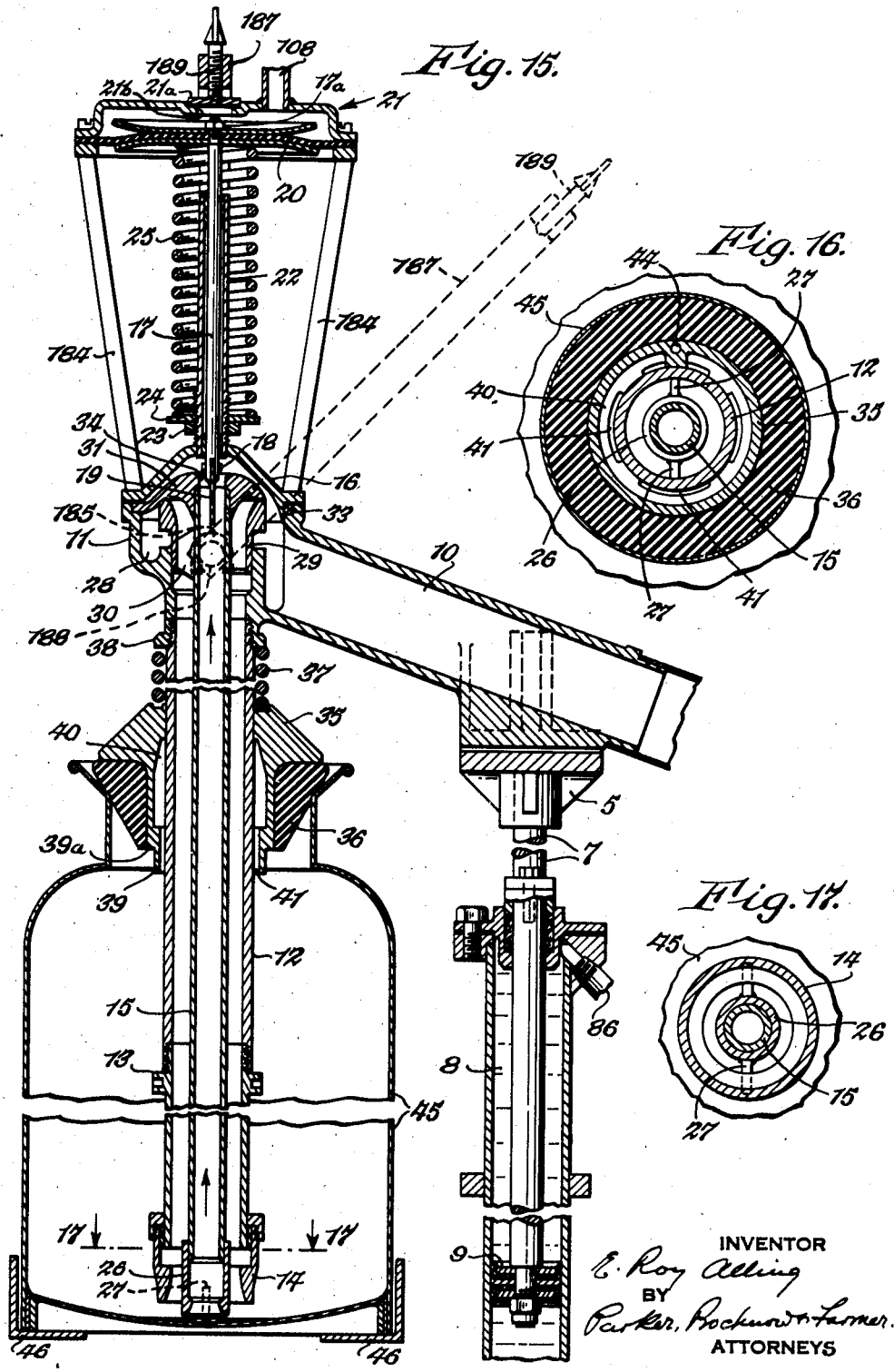
Fig. 15 is another similar sectional elevation of the emptying mechanism, similar to Fig. 12, but at the completion of the removal of milk from the can, the section being taken approximately along the line 15—15 of Fig. 12.
Fig. 16 is a sectional plan through the same at the stopper or sealing head, the section being taken approximately along the line 16—16 of Fig. 12.
Fig. 17 is another sectional plan of the same, the section being taken approximately along the line 17—17 of Fig. 15.

When the cross head 5 reaches its upward limit of movement, it is held in that position until the continued operation of the motor 80 carries the cam 76 around into a position to engage roller 75 and start another forward or feeding movement of the cans, whereupon the cycle of operation as above recited is again repeated. However, just before the cross head 5 reached its upper limit of movement, its lug 183 engaged the lever 181 and through it lifted the link 180 and the latch 177, which released the arm 161 on the drip saving receptacle, whereupon the spring 163 shifted the receptacle 154 promptly into a position beneath the lower end of the emptying conduit 12 to collect any drip therefrom. The lever 172 had previously been returned by its spring 172a to the full line position shown in Fig. 4 ready for a new latching movement at the completion of the next feeding movement of the cans, whereupon the receptacle 154 will again be shifted from beneath the emptying conduit 12 just as the latter is about to be lowered.

Where the emptying device is used for removing milk from cans, for example, it is important that all parts exposed to milk be accessible for cleaning at the conclusion of each day's operation, or at suitable intervals. It is therefore important that access be had to the interior of the collecting head 11 for the cleaning of all the surfaces therein which are exposed to the milk or other liquid being removed from the cans. Accordingly, the air motor 21 is supported on a frame 184 which is provided on the cover 16, and the cover, as explained hereinabove, is removably confined to the collector head 11. A suitable gasket is interposed between the cover 16 and the head 11 (Figs. 12 and 15). The diametrically opposite sides of the head 11 are provided with external bosses 185 (Figs. 12, 13 and 15) which have slots 186 extending upwardly into the same from the lower edges thereof. A clamping bail 187 is provided with hinge pins 188 which are received in the slots 186, and the bail 187, after its pins 188 have been engaged in the slots 186, may be swung on pins 188 to a position over the air motor 21.

A screw 189 is threaded through the cross part of the bail 187, so as to engage against a cap 21a normally closing and sealing an opening 21b in the cover of the air motor 21 and clamp it and, through it, the motor 21, the flange 184 and cover 16 removably to the upper face of the collecting head 11. The tightening of the screw 189 will draw the pins 188 upwardly in the slots 186 and thus prevent their removal from the bosses 185. When it is desired to disassemble the emptying head in order to cleanse it, the screw 189 is loosened, and then the bail 187 is swung laterally to clear the air motor 21, whereupon the bail 187 may be dropped to carry its pins 188 out of the slots 186. The air motor 21 with frame 184, cover 16, deflector 31, valve 29 and tube 15 may then be lifted from the collecting head 11, and, by removing cap 21a, access may be had to nut 17a on the end of motor rod 17. Upon removal of nut 17a, the motor rod 17 may be disconnected from the diaphragm of the air motor and tube 15, rod 17 and deflector 31 removed for cleaning.

In the embodiment of the invention illustrated in Figs. 19 to 23, the construction and arrangement is the same as in Figs. 1 to 18, except that instead of using hydraulic means for feeding the cans beneath the emptying conduit in a step by step manner, and for lowering and elevating the cross head, I have utilized cams driven by a synchronous or constant speed motor. In this embodiment of the invention, parts corresponding to those in Figs. 1 to 18 have been designated by similar reference characters, and will not again be described except where necessary to explain the relationship to other modified parts of the apparatus.

The dog bars 48 which feed the cans forwardly, instead of being reciprocated by means of the rack 62, gear 59 and arm 60, are actuated by a link 190 (Figs. 19 to 21) which is pivotally connected to the dog bars through a pivot pin 191 which extends between a pair of bearing lugs 192 that are secured in any suitable manner to the dog bars so as to depend therefrom. The link 190 (Fig. 19) is pivotally connected at its other end by a pin 193 to a crank arm 194 which is fixed on a shaft 195. The shaft 195 is rotatably supported in suitable brackets 196 mounted beneath the frame 1, so as to extend in a direction from side to side of the can feeding mechanism. Also fixed on the shaft 195 is another crank arm 197 (Figs. 22 and 23) which is pivotally connected by pin 198 to one end of a link 199, the other end of the link being pivotally connected by a pin 200 to the lower end of a cam lever 201 that is pivoted at 202 in the frame. Intermediate of its ends, the lever 201 is provided with a cam roller 203 (Fig. 23) which runs in a cam groove 204 provided on one face of a cam member 205 which is fixed on a shaft 206.

The shaft 206 has fixed thereon a gear 207 (Fig. 22) which meshes with and is driven by a pinion 208 of a gear reduction mechanism 209, which in turn is driven by a motor 210, preferably of the constant speed type. The gear reduction mechanism 209 reduces the speed of the motor 210 to a very substantial extent, so that the gear 207 will be driven at a desired, relatively slow rate. Thus, when the motor 210 is operated, it slowly rotates the cam element 205 and the cam groove 204 thereof, which is eccentric to the axis of rotation of the shaft 206, by its engagement with the roller or cam follower 203 oscillates the lever 201, and through the mechanism connected thereto it causes intermittent reciprocations of the dog bars 48. By proper design of the cam groove 204, the dog bars may be given the same relative movement as in the hydraulically actuated mechanism described in connection with Figs. 1 to 18. Also provided on the cam element 205, and preferably on the opposite face from the groove 204, is another cam groove 211 which is eccentric with respect to the shaft 206. A lever 212 is pivoted at one end by a pin 213 to a suitable part of the frame and intermediate of its ends, is provided with a roller or cam follower 214 which runs in the cam groove 211 so that as the cam element 205 rotates, the cam groove 211 will cause alternate elevation and lowering of the free end of the lever 212.

This free end of the lever 212 is pivotally connected by a pin 215 to the lower end of a link 216, which in turn is pivotally connected by a pin 217 to the cross head 5. The cross head 5 is mounted for reciprocation on the guide rods 3, as in Figs. 1 to 18. Thus, as the cam element 205 rotates, the cam groove 211 will cause elevation and lowering of the cross head 5, and the latter mounts for movement therewith the emptying conduit 12 and the emptying apparatus associated therewith. The design of the cam groove 211 and its position on the cam element 205 is such that it causes the elevation of the cross head 5 just before the cans are fed forwardly under control of the cam groove 204, and holds it elevated until the end of the forward feeding movement of the cans. Then while the cam groove 204 is retracting the dog bars, the groove 211 will first lower the cross head 5, hold it lowered for the balance of the interval until just before a new feeding movement of the cans, and then elevate it to lift the emptying conduit 12 from the cans just before a new feeding operation starts.

The cam element 205 is also provided with a peripheral cam surface 218 which is concentric with the axis of rotation of the shaft 206 except for a short depressed stretch 218a which is shown clearly in Fig. 23. Riding on this peripheral cam surface 218 is a roller 219 carried on a lever 220, which in turn is pivoted at 221 to the frame 1. The frame 1, of course, may be somewhat different in shape than the frame 1 in Figs. 1 to 18, but it is so designed as to provide the necessary supports for the various moving parts. The lever 220 is also pivotally connected to a link 222, which in turn is pivotally connected to an arm 223 which has a tubular pivoted end 224 (Fig. 19). The arm 223 corresponds to the arm 161 of Figs. 1 to 18 and at its tubular end 224, it slidingly receives the depending tube 226 of the drip saver arm 225 but is drivingly connected thereto as in Figs. 1 to 18. The arm 225 mounts the drip saving receptacle 227 which corresponds to the receptacle 124 of Figs. 1 to 18. A spring 228 acting on the lever 220, urges roller 219 against cam surface 218 and the receptacle 227 beneath the emptying conduit.

In this embodiment of the invention (Figs. 19 to 23) a number of the controls operated by the cross head 5 in Figs. 1 to 18 may be omitted, it being necessary to retain the switch 122 and its operating cam 123 on the cross head which control the solenoid 117 jointly with the micro-switch 116. The latter is controlled by the air motor 115, the same as in Figs. 1 to 18. Thus the air motor 115 and the cam controlled switch 122 will jointly, through the control of the solenoid 117, regulate the air under pressure delivered to the air motor 21 and the operations of the valve 29 for the larger passage within the emptying conduit 12, the same as in Figs. 1 to 18.

The operation of the apparatus illustrated in Figs. 19 to 23 should be clear from the foregoing description, in view of the detailed description of the operation of the apparatus shown in Figs. 1 to 18, but it will be briefly summarized. Assuming that the parts are in the position shown in Figs. 19 to 23, the cross head has just been elevated by the cam groove 211, and the cam roller 219 is rolling down into the depression 218a in the peripheral cam 218, which permits spring 228 to shift the drip saver beneath the emptying conduit 12 (as shown in Fig. 19). The cam groove 204 begins to operate the lever 201 to the right in Fig. 23, with continued rotation of the shaft 206 in the direction of the arrow in Fig. 23, and the lever 201 through the link 199, crank arm 197, shaft 195, crank arm 194 and link 190 will advance the dog bars 48 and through the dogs thereon will advance all of the cans a distance of one step, so as to bring a fresh can beneath the emptying pipe 12. After this movement the cam roller 219 will again be cammed outwardly and will shift the drip saving receptacle 227 from beneath the emptying conduit 12, and at the same time or immediately thereafter the cam groove 211 will start a lowering of the cross head 5, so as to lower the emptying conduit into the next can that is now beneath it. The cam groove 204 may also return the dog bars to their initial positions and hold them there until a new feeding operation is to be performed.

When the stopper or sealing head 35 engages with the mouth of the can it will be held against the can mouth by the spring 37 and continued descent of the conduit 12 will carry the flange 13 away from the stopper and open the tube 42, whereupon air pressure will be delivered to the interior of the can to force the contents out through the conduit 12 and tube 15, as explained in connection with Figs. 1 to 15. When the liquid is largely exhausted, the fall in pressure in tube 43 will cause an actuation of the air motor 115 of the micro-switch to cause a closing of the main valve in the conduit 12, and the remaining removal of the contents will be through the tube 15, as explained in connection with Figs. 1 to 8. At the proper time, the cam groove 211 will again elevate the cross head 5 and as it completes its elevating movement the roller 219 will again enter the depression 218a in the cam surface 218 through the action of the spring 228, which shifts the drip saving receptacle again beneath the conduit 12. Immediately thereafter the cam groove 204 causes another feeding movement of the cans through a forward actuation of the dog bars, and the cycle is again repeated.

It will be observed that in both embodiments of the invention, the cans or receptacles are all emptied while in upright positions and while travelling along a prescribed pathway, and tests with milk cans, for example, have shown that no appreciable amount of milk is left in the cans at the conclusion of an emptying operation, and that standard milk cans have been emptied successfully and satisfactorily as fast as eleven cans per minute. By this manner of emptying the cans there is no possibility of dirt from the exterior of the cans contaminating the milk or other liquid or material being removed from the cans, and the various parts in contact with the milk are easily disassembled or made accessible for cleaning.

In the embodiment of the invention shown in Fig. 24, I have illustrated the application of the can emptying device, such as shown in Figs. 1 to 23, to an installation suitable for milk plants, for example, where the milk cans are fed in through a suitable conveyor, the cans emptied while in upright positions, inverted, passed through a can washing machine where the cans and covers are thoroughly cleansed and sterilized, the cans upended and the covers replaced, all without manual attention. In this part of the invention, the cans are carried upon a suitable conveyor 229 to the can emptying mechanism 230 which may be as shown in Figs. 1 to 23. Just as the cans are received by the emptying mechanism 230, the covers 231 of the cans 45 are removed and placed in a suitable elevated track 232, whereupon the covers are moved by gravity or by power feed into a can and cover washer 233 of any suitable construction, many of which are on the market. The details of such can and cover washers are not disclosed, because, per se, they form no part of the present invention.

As the cans leave the emptying device 230 where the milk or other contents have been removed, they are pushed by the dog bars in succession upon a plate 234 which is an extension of the trackway formed by the angle strips 46. The plate 234 is mounted on an arm 235 which is pivoted at 236. The arm 235 has a cam roller 237 which is operated by a cam groove 238 provided in a cam element 239, and this element 239 is fixed on an operating shaft 240 which is driven at a constant rate of speed from any suitable source of power. The cam element 239 also is provided with a cam groove 241 which operates a lever 242 that is pivoted at 243 on a suitable part of the frame. The lever 242 also mounts a cam 244 which engages beneath the pivoted plate 245 which forms the entrance of a trackway 246 of the can washer 233. A cradle 247 is mounted on a shaft 248 which is rotated continuously in the same direction, which would be clockwise in Fig. 24, from the shaft 240 in any suitable manner, such as through a chain drive 249.

The cradle 247 may be of the type shown in U. S. Patent to Alling No. 2,041,451, and has spaced arms with flanges at the ends, so that as the cradle rotates in the same direction the spaced arms thereof will pick up a can from the plate 234, as shown by the dotted lines in Fig. 24, invert it and deposit it on the plate 245, as shown by the full lines in Fig. 24. It will be understood, of course, that the plates 234 and 245 have slots in them through which the arms of the cradle 247 may pass as the cradle rotates. The lever 242 also has an arm 250 which extends between the rotating arms of the cradle, so as not to interfere with the rotation of the cradle, but is disposed in a position to swing upwardly between the rotating arms of the cradle and engage a can that has been inverted by the cradle and push the can over the plate 245 upon the platform 246 of the can washer. The arm 250 which pushes the can from the cradle operates to engage and push the can at about the same time that the platform 246 is elevated by the cam 244. The position of the arm 250 after it has pushed a can over upon the platform 246 of the can washer is shown by dotted lines in Fig. 24.

The cam grooves in the cam element 239 are so designed and disposed with respect to one another, as to lower the plate 234 into the position shown in dotted lines in Fig. 24 just as the cradle is in the dotted line position, thus facilitating the picking up of the can by the cradle. When the cradle is rotated into the position shown in full lines in the drawings, the cam groove 241 will elevate the plate 245 and push the can from the plate over on the platform 246 so as to remove the can from the path of rotation of the arms of the cradle. After the cans and covers have been washed in the washer 233, the covers upon release will continue to travel down the trackway 232, it being understood that the covers are moved through the washer and released at the proper time from the washer on to the succeeding section of the track 232. The cans are pushed out from the washer upon an upending device, one of which is disclosed in U. S. Patent No 2,041,451, but another and simple device for this purpose is illustrated. It includes a pivoted plate 251 which is hinged at 252. An arm 253 is operated by a cam groove 254 provided in another cam element 255.

A rotating cradle 256 similar to cradle 247 is mounted on and rotates with the shaft 257 and the arms of this cradle pass through slots in the plate 251 the same as the arms of cradle 247 pass through slots in the plate 234. The cam element 255 is driven from a shaft 258 and the latter drives the cradle 256 in the same manner that the cradle 247 is driven from the shaft 242. The cans, after being swung by the cradle into the full line position shown in the drawings, will be deposited on a pivoted plate 259 which is hinged to swing from the full to the dotted line positions shown in the drawings, under the control of a cam groove 260 also provided in the cam element 255. This is accomplished by a lever 261 pivoted at 262 and having a roller or cam follower which runs in the cam groove 260. The lever 261 is connected by a link 263 to the pivoted plate 259.

The lever 261 also has an arm 264 which passes between the arms of the rotating cradle, so as to engage the cans in the cradle and push them clear of the cradle and upon the tilting plate 259, and the cans when so up-ended are pushed laterally from the plate 259 beneath the discharge end of the cover guide 232 where the covers are deposited on the up-ended cans.

Thus it will be clear that after the covers are removed from the cans as they reach the emptying device, the milk will be emptied automatically, the cans inverted, passed through the washer, both cans and covers being automatically conveyed through the washer and cleansed, the cleansed cans up-ended into upright positions, and the covers replaced thereon without manual attention, thus providing a continuous automatic handling of the cans.

The can inverting and can upending mechanisms at the opposite ends of the washing means are driven in timed relation to the feeding of the cans through the washing means, and to the feeding of the cans through emptying positions, so that the handling of the cans, the emptying of them, their inversion, washing, upending and delivery, and cover replacement on the cans will be automatic.

It will be understood that various changes in the details and materials, which have been herein described and illustrated in order to explain the nature of the invention, may be made by those skilled in the art within the principle and scope of the invention, as expressed in the appended claims.

I claim as my invention:

1. An emptying device for containers which may vary in height comprising means for supporting said containers to be emptied in approximately upright positions and guiding them along a prescribed path, a conduit disposed above said supporting means and beneath which said containers must pass, means operable automatically in timed relation to the travel of the containers along said path for causing relative movement of said conduit into the upright container into close proximity to the container bottom to remove the contents of the container and then removal therefrom, and means including a stopper on said conduit and engageable with containers of different heights during said relative movement, said means being effective when said conduit is within said container for creating greater gaseous pressure in said container than in said conduit for emptying the contents of said container through said conduit by pressure differences on said contents.

2. An emptying device for containers which may vary in height comprising means for supporting said containers in approximately upright positions and conveying them in a prescribed path, means associated with said supporting means for causing the containers to move along said path in a step by step manner, with intervals of rest between steps, a conduit fully open at its lower end disposed above said path and beneath which the containers pass and beneath which a container will be disposed when in one interval of rest, means operable automatically in timed relation to the movement of said containers along said path for causing relative movement of said conduit into each container sufficiently to position the inlet end of the conduit in close proximity to the container bottom while that container is at rest beneath the conduit, and then removal from that container, and means operable while said conduit is within a container for creating greater gaseous pressure in said container than in said conduit for emptying the contents of the container through said conduit, by the gaseous pressure difference on the contents.

3. An emptying device for containers which may vary in height and which comprises means for supporting the containers in approximately upright positions and conveying them through a prescribed path, means for causing travel of said containers through said path, conduit means disposed above said path, open at its lower end at all times and relatively operable into and out of the containers in timed relation to their travel along said path, and means associated with said conduit means and operable automatically when said means is lowered within a container for displacing the liquid contents of the container through said conduit means with a medium of lesser density than said contents by creating pressure differences on said liquid contents.

4. A device for removing liquids from containers comprising means for supporting the containers in approximately upright positions and conveying them through a prescribed path, a conduit disposed above said path and mounted for relative vertical movement into said containers in succession sufficiently to position its inlet end closely adjacent each container bottom to empty the liquid contents of that container and having means for sealing each container which it enters by seating against the opening through which said conduit enters that container, before the full entry of the conduit has accurred and continuing in its seat during the remaining entry of the conduit, and means cooperating with the conduit when said conduit is within the container and said sealing means closes said container for applying sufficient gaseous pressure to the liquid contents of the container to force said contents through said conduit.

5. An emptying device for containers comprising means for supporting the containers in approximately upright positions and conveying them through a prescribed path, a conduit disposed above said path and mounted for relative descent into and elevation out of said containers to empty the same, means cooperating with the conduit when within the container for creating a pressure difference on the contents of the container and in said conduit, with the gaseous pressure on the contents of the container greater than that in said conduit and removing said contents through said conduit by said pressure difference, a drip receiver mounted for movement in a horizontal path into and entirely out of a position beneath the conduit when said conduit is removed from a container, and means operable in timed relation to the relative movements of said conduit into and out of a container for moving said receiver beneath the lower end of the conduit when it is outside of and above a container and moving it aside automatically just before the conduit is lowered into a container.

6. An emptying device for containers comprising means for supporting the containers with their open ends uppermost and conveying them along a prescribed path, a conduit disposed above said path, means for causing relative movement of said conduit into and out of a container beneath it, said conduit having therein a relatively large passage and a relatively small passage, both being open at approximately the lower end of said conduit, means operable, when said conduit is within the container, for creating greater gaseous pressure in said container than in said conduit and removing the contents of the container through the passages of said conduit by the pressure difference on said contents, and valve means in said large passage and operable to close said large passage, whereby when the level of contents in the container reaches approximately the lower end of said large passage said large passage may be closed and the remainder of the said contents may be removed through said small passage.

7. An emptying device for containers comprising means for supporting the containers with their open ends uppermost and conveying them through a prescribed path, a conduit disposed above said path, means for causing relative movement of said conduit into and out of any container beneath it to empty the same, said conduit having sealing means engageable with and sealing the mouth of each container beneath it after it enters that container and before it completes its movement into that container, means operable when said conduit is within a container for establishing greater gaseous pressure in said container than in said conduit, whereby the contents of said container may be removed through said conduit by pressure differences, and means operable automatically by continued movement of said conduit further into a container after it seals the mouth of that container and while the conduit is within that container beneath it for initiating such pressure differences and for stopping said pressure differences automatically when said conduit unseals the mouth of said container beneath it.

8. Apparatus for removing the contents of containers while said containers are approximately upright, and which containers may vary somewhat in height, which comprises means for conveying said containers in approximately upright positions through a prescribed path, a conduit disposed above said path and relatively movable into and out of a container beneath it, a sealing head mounted on the exterior of said conduit intermediate of its ends and slidable endwise on said conduit to a limited extent, resilient means continuously urging said sealing head into its lowermost position on the conduit, said head being engageable with the mouth of the container into which the conduit may be placed and being held thereagainst in pressure tight engagement by said resilient means while said conduit continues to enter the container, a source of gas under pressure, a tube connecting said source to said sealing head, said sealing head having a passage connected to said tube and opening downwardly through the inner face of said head into the container, whereby gas under pressure may enter the container through said passage in said sealing head, said conduit having a valve face cooperating with the opening of said passage from said head for normally closing said passage when said head is in its lowermost position on said conduit and for automatically opening said passage when the entering movement of the sealing head is stopped by engagement with the mouth of the container and the conduit continues to enter into the container, whereby when gas pressure is supplied to the interior of said container through said tube, the contents of the container will be forced out of the container through said conduit by pressure differences.

9. Apparatus for removing the contents of containers while said containers are approximately upright, and which containers may vary somewhat in height, which comprises means for conveying said containers in approximately upright positions through a prescribed path, a conduit disposed above said path and relatively movable into and out of a container beneath it, a sealing head mounted on the exterior of said conduit intermediate of its ends and slidable endwise on said conduit to a limited extent, resilient means for urging said sealing head into its lowermost position on the conduit, said head being engageable with the mouth of the container through which the conduit moves in entering that container, and being held thereagainst in pressure tight engagement by said resilient means while said conduit continues to enter the container, and means rendered effective automatically by continued movement of said conduit further into said container following said pressure tight engagement of said sealing head with the mouth of the container into which said conduit is inserted, for forcing the contents of said container through said conduit by pressure differences.

10. In an emptying device for upright containers of the type in which the contents of the container are removed through a conduit inserted into the container, upon the application of pressure differences created in the interior of the container and said conduit, which comprises a conduit having an approximately vertical leg open at its lower end, a stopper slidably mounted on said leg, a flange on said conduit against which said stopper seats when it descends on said conduit, resilient means urging said stopper downwardly against said flange, whereby when said conduit leg enters a container through the mouth thereof, said stopper will engage with the mouth of the container and seal the same while the conduit leg may continue to enter the container, said stopper having an internal passage opening downwardly through the portion of its lower face which seats against said flange, and closed by said flange when said stopper is seated against the flange, a source of gas under pressure, a tube connecting said source to said passage in said stopper, and means for causing said conduit leg to enter said container and leave it.

11. In an emptying device for upright containers of the type in which the contents of the container are removed through a conduit inserted into the container, upon the application of pressure differences created in the interior of the container and said conduit, which comprises a conduit having an approximately vertical leg open at its lower end, a stopper slidably mounted on said leg, a flange on said conduit against which said stopper seats when it descends on said conduit, means yieldingly urging said stopper downwardly against said flange, whereby when said conduit leg enters a container through the mouth thereof, said stopper will engage with the mouth of the container and seal the same while the conduit leg may continue to enter the container, said stopper having an internal passage opening downwardly through the face thereof which seats against said flange, and closed by said flange when said stopper is seated against the flange, a source of gas under pressure, a tube connecting said source to said passage in said stopper, means for inserting said conduit leg into said container and removing it therefrom, said conduit having therein a relatively large passage and a relatively small passage, both open at their lower ends, a valve in said relatively large passage, said stopper having another passage therethrough and opening through that face of said stopper which is within the container against which said stopper is seated, a tube leading from the outer end of the last-named passage, and means responsive to the pressure in the container communicated through the last-named tube for automatically closing said valve in said relatively large passage when the pressure in said last-named tube falls materially below that normally present in the container during the emptying of its contents and before the contents level falls below the opening at the lower end of the large passage in the vertical leg of the conduit.

12. In an emptying device for upright containers of the type in which the contents of the container are removed through a conduit inserted into the container, upon the application of pressure differences created in the interior of the container and said conduit, which comprises a conduit having an approximately vertical leg open at its lower end, a stopper slidably mounted on said leg, a flange on said conduit against which said stopper seats when it enters said conduit, means yieldingly urging said stopper downwardly against said flange, whereby when said conduit leg is inserted into a container through the mouth thereof, said stopper will engage with the mouth of the container and seal the same while the conduit leg may continue to enter the container, said stopper having an internal passage opening downwardly through the face thereof which seats against said flange, and closed by said flange when said stopper is seated against the flange, a source of fluid under pressure, a tube connecting said source to said passage in said stopper, means for inserting said conduit leg into said container and removing it therefrom, said conduit having therein a relatively large passage and a relatively small passage both open at their lower ends, a valve in said relatively large passage, said stopper having another passage therethrough and opening through that face of said stopper which is within the container against which said stopper is seated, a tube leading from the outer end of the last-named passage, a pressure responsive switch to which the outer end of said last-named tube is connected, and means for operating said valve and controlled by said switch, and effective to close said valve when the pressure in said second tube falls materially below that normally present in the container during the emptying of its contents through the relatively large passage in the conduit and before the contents level falls below the opening at the lower end of the large passage in the vertical leg of the conduit.

13. In an emptying device for upright containers of the type in which the contents of the container are removed through a conduit inserted into the container, upon the application of pressure differences created in the interior of the container and said conduit, which comprises a conduit having an approximately vertical leg open at its lower end, a stopper slidably mounted on said leg, a flange on said conduit against which said stopper seats when it descends on said conduit, means yieldingly urging said stopper downwardly against said flange, whereby when said conduit leg enters a container through the mouth thereof, said stopper will engage with the mouth of the container and seal the same while the conduit leg may continue to enter the container, said stopper having an internal passage opening downwardly through the face thereof which seats against said flange, and closed by said flange when said stopper is seated against the flange, a source of fluid under pressure, a tube connecting said source to said passage in said stopper, means for causing said conduit leg to enter and leave said container, said conduit having therein a relatively large passage and a relatively small passage, both open at their lower ends, a valve in said relatively large passage, said stopper having another passage therethrough and opening through that face of said stopper which is within the container against which said stopper is seated, a tube leading from the outer end of the last-named passage, and means responsive to the pressure in the container communicated through the last-named tube for automatically closing said valve in said relatively large passage when the pressure in said last-named tube falls materially below that normally present in the container during the emptying of the contents through the relatively large passage in the conduit and before the contents level falls below the opening at the lower end of the large passage in the vertical leg of the conduit, said other passage through said stopper opening through the inner face of said stopper within the zone sealed by the engagement of said stopper with the mouth of the container.

14. In an emptying device for upright containers of the type in which the contents of the container are removed through a conduit inserted into the container, upon the application of pressure differences created in the interior of the container and said conduit, which comprises a conduit having an approximately vertical leg open at its lower end, a stopper slidably mounted on said leg, a flange on said conduit against which said stopper seats when it descends on said conduit, means yieldingly urging said stopper downwardly against said flange, whereby when said conduit leg enters a container through the mouth thereof, said stopper will engage with the mouth of the container and seal the same while the conduit leg may continue to enter the container, said stopper having an internal passage opening downwardly through the face thereof which seats against said flange, and closed by said flange when said stopper is seated against the flange, a source of fluid under pressure, a tube connecting said source to said chamber in said stopper, means for causing entry of said conduit leg into said container and its removal therefrom, said conduit having therein a relatively large passage and a relatively small passage, both open at their lower ends, a valve controlling said relatively large passage, said stopper having another passage therethrough and opening through that face of said stopper which is within the container against which said stopper is seated, a tube leading from the outer end of the last-named passage, a pressure responsive switch to which the outer end of said last-named tube is connected, means for operating said valve and controlled by said switch, and effective to close said valve when the pressure in said second tube falls materially below that normally present in the container during emptying and before the contents level falls below the opening at the lower end of the large passage in the vertical leg of the conduit, and means controlled by the entry of said conduit leg into said container for causing an opening of said valve whenever said conduit leg is within a selected zone as it is entering a container.

15. A device for emptying containers which comprises a guideway for supporting containers to be emptied in approximately upright positions and guiding them along a prescribed path, means associated with said guideway for causing the containers to move along the guideway in a step by step manner, with intervals of rest between steps, a conduit disposed above said guideway and having a depending leg beneath which the containers pass and beneath which certain containers will be disposed when in one interval of rest, an operating element, a cam operated by said element, means controlled by said cam for causing a movement of the containers along the guideway by said movement causing means, a second cam also driven by said element in timed relation to the first cam, means operated by said second cam for causing entry of said depending leg into any container beneath it during one of said intervals of rest until the lower end of said leg is in close proximity to the container bottom and then removing it before the expiration of said interval of rest, means forming a stopper slidable on said leg for engaging and sealing the mouth of a container into which said leg is descending, means yieldingly urging said stopper along said leg and into pressure tight engagement with the mouth of a container when the leg is lowered, a stop on said leg for limiting the downward movement of said stopper on said leg, whereby when said stopper engages with and seals the mouth of a container said leg may continue to enter the container, and means rendered effective by the relative movement of said stopper from said stop after the stopper seats on the mouth of the container and the leg continues to enter the container, for admitting to the interior of the container a fluid under pressure for forcing the contents of the container through said conduit leg by pressure differences on the contents and in said conduit, while the leg continues to enter the container and continuing until the stop on the leg reengages the stopper during the removal of the leg from the container.

16. A device for emptying containers which comprises a guideway for supporting containers to be emptied, in approximately upright positions and guiding them along a prescribed path, means associated with said guideway for causing the containers to move along the guideway in a step by step manner, with intervals of rest between steps, a conduit disposed above said guideway and having a depending leg beneath which the containers pass and beneath which certain containers will be disposed when in one interval of rest, an operating element, a cam operated by said element, means controlled by said cam for causing a movement of the containers along the guideway by said movement causing means, a second cam also driven by said element in timed relation to the first cam, means operated by said second cam for causing the entry of said depending leg into any container beneath it during one of said intervals of rest and then removing it before the expiration of said interval of rest, means operable while said conduit is lowered into a container for emptying the contents of the container through said conduit leg by pressure differences on the contents and in said conduit, a drip receiver mounted for movement laterally into and out of a position beneath said depending conduit leg when the latter is removed from a container, and cam means also driven by said element for causing movement of said receiver into a position beneath said conduit leg when the latter is removed from a container and for removing it from beneath the conduit leg to permit entry of said leg into a container.

17. A device for emptying containers comprising means for supporting the containers in approximately upright positions and conveying them in succession through a prescribed path, a conduit disposed generally above said path and having a depending leg open at its lower end and having its other portion leading laterally from the upper end of said depending leg, means for causing relative vertical movements of said leg and any container beneath it and insertion of said depending leg into that container, moving along said path and then removal from the same, a stopper carried on said depending leg and yieldingly urged downwardly on said leg into pressure tight engagement with the mouth of any container into which said leg may be inserted and yielding on said conduit during further entry of said conduit leg into, and while the bottom of said leg is still a substantial distance from the bottom of, a container, and means rendered operative immediately upon any continued entry of said conduit leg after seating of said stopper and continuing during such further entry for creating a pressure difference between the interior of said container and said conduit and thereby forcing the contents of said container out through said conduit.

18. A device for emptying containers comprising means for supporting the containers in approximately upright positions and conveying them in succession through a prescribed path, a conduit disposed generally above said path and having a depending leg open at its lower end and having its other portion leading laterally from the upper end of said depending leg, means for causing relative vertical movements of said conduit and any container beneath it so as to insert said depending leg into a container moving along said path and remove it therefrom, a stopper carried on said depending leg for engagement with the mouth of any container into which said leg may be inserted and yielding on said conduit during further entry of said conduit leg into a container, means rendered operative by such continued entry of said conduit leg after seating of said stopper for creating a pressure difference between the interior of said container and said conduit and thereby forcing the contents of said container out through said conduit, said depending leg having therein a relatively large passage and a separate relatively small passage, but both opening into said laterally extending section, a valve controlling said relatively large passage by which said relatively large passage may be closed when the contents level approximately reaches the lower end of said large passage, to enable complete emptying through said relatively small passage.

19. A device for emptying containers comprising means for supporting the containers in approximately upright positions and conveying them in succession through a prescribed path, a conduit disposed generally above said path and having a depending leg open at its lower end and having its other portion leading laterally from the upper end of said depending leg, means for causing relative vertical movements of said leg and any container beneath it so as to insert said depending leg into containers moving along said path and removing it from the same, a stopper carried on said depending leg for engagement with the mouth of any container into which said leg may be inserted and yielding on said conduit during further entry of said conduit leg into a container, means rendered operative by such continued entry of said conduit leg after seating of said stopper for creating a pressure difference between the interior of said container and said conduit and thereby forcing the contents of said container out through said conduit, said depending leg having therein a relatively large passage and a separate relatively small passage, but both opening into said laterally extending section, means responsive to a material fall in said pressure difference for closing said relatively large passage, and means also responsive to the insertion of said conduit into a container and rendered effective automatically when said conduit is actually entering said container for causing an opening of said relatively large passage.

20. The improved method of rapidly emptying a container through the mouth thereof and while in an approximately upright position with maximum possible completeness which comprises inserting an element having relatively large and small passages through said mouth into said container until the open lower end of the larger passage is near but spaced somewhat above the bottom of the container, and the open lower end of the smaller passage is in close proximity to said container bottom, creating fluid pressure differences between the interior of said container and both of said passages to cause flow of the contents of the container outwardly of the container through both of said passages, and closing said large passage after the level of the contents in the container has descended to a predetermined extent, while continuing a pressure difference between the smaller passage and the interior of the container, to complete the emptying through the smaller passage.

21. The improved method of rapidly emptying a container through the mouth thereof and while in an approximately upright position with maximum possible completeness which comprises inserting an element having relatively large and small passages through said mouth into said container, until the open lower end of the smaller passage lies in close proximity to the lowest point of the bottom of the container, and the open lower end of the larger passage is near but spaced further than the open lower end of the other passage from said bottom, creating fluid pressure differences between the interior of said container and both of said passages to force the contents of said container outwardly through said passages, and closing the larger passage before the emptying has been completed while continuing a pressure difference between the smaller passage and the interior of the container to complete the emptying through the smaller passage.

22. In a receiving plant for milk and the like in which the milk or other liquid is received in cans or containers, the milk removed, the cans cleaned and returned, the improved apparatus therefor which comprises can and cover washing means having means for conveying the cans and covers and cleaning them while so conveyed, can receiving and emptying means for receiving and conveying the cans in approximately upright positions and emptying them while in upright positions, means interposed between the discharge end of the emptying means and the entrance end of the washer for receiving and automatically inverting the cans from the emptying means and feeding them in succession in inverted positions to said washing means.

23. A device for emptying containers while the containers are supported with their open ends uppermost, which comprises means having a pair of depending passages open at their lower ends, means for causing relative movement of said passages into and out of a container to be emptied through the open upper end of the container, a valve operable to close one of said passages, means for creating a relatively greater pressure in the interior of the container than in said passages for forcing the contents of said container out through said conduits by pressure differences, means directly responsive to said pressure differences for closing said valve in one of said conduits automatically whenever said pressure difference on said contents falls below a predetermined value, and opening it automatically whenever said pressure difference exceeds said value, whereby maximum completeness of the emptying operation is effected.

24. A device for emptying a container, comprising a support for an approximately upright container, an upright tubular element disposed above said support, means for causing vertical movement of said support and element relatively to one another to cause the lower end of said element to enter said container and descend until it reaches approximately the bottom of said container, said element having a pair of ascending passages therein, both open at the lower end of said element and both communicating at their upper ends with a laterally extending common passage, said common passage being inclined away from the connection to said ascending passages, one of said ascending passages being relatively small and the other relatively large, a valve at the upper end of said larger passage and operable to close and open communication to said common passage, a stopper slidingly mounted on said element and of a size to engage and seat in the mouth of the container, means yieldingly urging said stopper downwardly on said element, a stop on said element for limiting the downward movement of said stopper on said element, said stopper having a chamber therein, and means for supplying compressed fluid to said chamber, said element and stopper having cooperating portions for admitting said compressed fluid from said chamber to the interior of said container below said stopper when said stopper is away from said stop on said element and automatically closing said chamber of said stopper when said stopper reengages said stop, whereby as said element enters said container said stopper will seat in the mouth of said container and be held back thereby, and continued movement of said element into said container will automatically open communication from said chamber in the stopper to the interior of said container and admit compressed fluid to said container at the top thereof, and force the contents of the container outwardly through said passages, said valve being closable, whereby after most of the contents have been emptied the outflow may be confined to the smaller passage and thus more complete emptying of the contents obtained.

25. A device for emptying a container, comprising a support for an approximately upright container, an upright, tubular element disposed above said support, means for causing vertical movement of said support and element relatively to one another to cause the lower end of said element to enter said container and descend until it reaches approximately the bottom of said container, said element having a pair of ascending passages therein, both open at the lower end of said element and both communicating at their upper ends with a laterally extending common passage, said common passage being inclined away from the connection to said ascending passages, one of said ascending passages being relatively small and the other relatively large, a valve at the upper end of said larger passage and operable to close and open communication to said common passage, a stopper slidingly mounted on said element and of a size to engage and seat in the mouth of the container, means yieldingly urging said stopper downwardly on said element, a stop on said element for limiting the downward movement of said stopper on said element, said stopper having a chamber therein, means for supplying compressed fluid to said chamber, said element and stopper having cooperating portions for admitting said compressed fluid from said chamber to the interior of said container below said stopper when said stopper is away from said stop on said element and automatically closing said chamber of said stopper when said stopper reengages said stop, whereby as said element enters said container said stopper will seat in the mouth of said container and be held back thereby, and continued movement of said element into said container will automatically open communication from said chamber in the stopper to the interior of said container and admit compressed fluid to said container at the top thereof, and force the contents of the container outwardly through said passages, said valve being closable, whereby after most of the contents have been emptied the outflow may be confined to the smaller passage and thus more complete emptying of the contents obtained, the lower end of the larger passage terminating at a slightly higher level than the lower end of said smaller passage, and said smaller passage being in close proximity to the lowest part of the bottom of the container when said element has descended to maximum extent in said container, and pressure responsive means controlled by the fluid pressure within said container and operable automatically to close said valve when the level of the contents in the container descends below the lower end of the larger passage and the rush of fluid therethrough lowers the pressure in the container, whereby the remaining contents will be forced outwardly through the smaller passage.

26. A device for emptying a container, comprising a support for an approximately upright container, an upright, tubular element disposed above said support, means for causing vertical movement of said support and element relatively to one another to cause the lower end of said element to enter said container and descend until it reaches approximately the bottom of said container, said element having a pair of ascending passages therein, both open at the lower end of said element and both communicating at their upper ends with a laterally extending common passage, said common passage being inclined away from the connection to said ascending passages, one of said ascending passages being relatively small and the other relatively large, a valve at the upper end of said larger passage and operable to close and open communication to said common passage, a stopper slidingly mounted on said element and of a size to engage and seat in the mouth of the container, means yieldingly urging said stopper downwardly on said element, a stop on said element for limiting the downward movement of said stopper on said element, said stopper having a chamber therein, means for supplying compressed fluid to said chamber, said element and stopper having cooperating portions for admitting said compressed fluid from said chamber to the interior of said container below said stopper when said stopper is away from said stop on said element and automatically closing said chamber of said stopper when said stopper reengages said stop, whereby as said element enters said container said stopper will seat in the mouth of said container and be held back thereby, and continued movement of said element into said container will automatically open communication from said chamber in the stopper to the interior of said container and admit compressed fluid to said container at the top thereof, and force the contents of the container outwardly through said passages, said valve being closable, whereby after most of the contents have been emptied the outflow may be confined to the smaller passage and thus more complete emptying of the contents obtained, the lower end of the larger passage terminating at a slightly higher level than the lower end of said smaller passage, and said smaller passage being in close proximity to the lowest part of the bottom of the container when said element has descended to maximum extent in said container, and pressure responsive means controlled by the fluid pressure within said container and operable automatically to close said valve when the level of the contents in the container descends below the lower end of the larger passage and the rush of fluid therethrough lowers the pressure in the container, whereby the remaining contents will be forced outwardly through the smaller passage, said pressure responsive means including a passage through said stopper to the lower face thereof and also means connected to said last named passage and controlling the operation of said valve.

27. A device for emptying a container, comprising a support for an approximately upright container, an upright, tubular element disposed above said support, means for causing vertical movement of said support and element relatively to one another to cause the lower end of said element to enter said container and descend until it reaches approximately the bottom of said container, said element having a pair of ascending passages therein, both open at the lower end of said element and both communicating at their upper ends with a laterally extending common passage, said common passage being inclined away from the connection to said ascending passages, one of said ascending passages being relatively small and the other relatively large, a valve at the upper end of said larger passage and operable to close and open communication to said common passage, a stopper slidingly mounted on said element and of a size to engage and seat in the mouth of the container, means yieldingly urging said stopper downwardly on said element, a stop on said element for limiting the downward movement of said stopper on said element, said stopper having a chamber therein, and means for supplying compressed fluid to said chamber, said element and stopper having cooperating portions for admitting said compressed fluid from said chamber to the interior of said container below said stopper when said stopper is away from said stop on said element and automatically closing said chamber of said stopper when said stopper reengages said stop, whereby as said element enters said container said stopper will seat in the mouth of said container and be held back thereby, and continued movement of said element into said container will automatically open communication from said chamber in the stopper to the interior of said container and admit compressed fluid to said container at the top thereof, and force the contents of the container outwardly through said passages, said valve being closable, whereby after most of the contents have been emptied the outflow may be confined to the smaller passage and thus more complete emptying of the contents obtained, said element having its lowermost section telescopically slidable on the upper section, whereby when said element descends in a container, the lowermost section will engage the bottom of the container and may slide along the upper section of said element for a limited distance during the final descent of the element into the container, whereby the openings to said passages will always be positioned at the proper distances from the bottom of the container, even when the containers have bottoms at different levels from the support on which the containers may be resting.

28. A device for emptying a container comprising an upright, tubular element, a support for the container, said element and support being relatively movable vertically to cause the lower end of said element to descend into a container on said support, said element having an ascending passage therethrough end to end, open at its lower end, and also having a laterally extending passage at its upper end which drains away from the upper end of said ascendng passage, the lower end portion of said element being formed of sections telescopically slidable on one another so as to form a collapsing but continuous passage, whereby as said element descends in said container, the lower end of the element may contact with the bottom of the container and be held back thereby while the remaining part of the element continues to descend to a limited extent, means for forcing the contents of said container outwardly through the passage of said element by pressure differences, and means for causing relative vertical movement of said container support and said element and thereby causing said element to descend into a container to be emptied and to rise therefrom.

29. A device for emptying containers comprising a container support, an upright, tubular element, means for causing relative vertical movement of said support and element and thus relatively causing the lower end of said element to descend into a container on said support until the lower end of said element strikes the bottom of said container, the lower end of said element being yieldable to permit limited descent of said element after the lower end strikes the bottom of the container, said element having a passage from the lower end thereof to a point above the mouth of the container and then extending laterally and downwardly therefrom, means for creating different pressure differences in said passage and said container to force the contents of the container outwardly through said passage.

30. A device for emptying containers comprising a container support, an upright tubular element mounted above said support, means for causing relative vertical movement of said support and element so as to cause the lower end of said element to descend into a container on said support until the lower end of said element is in close proximity to the bottom of said container, said element having a pair of ascending, separate passages therein opening downwardly through the lower end of said element and extending above the mouth of said container, said element also having means communicating with the upper ends of said passages and conducting away any contents of said container which pass upwardly through said passages to the tops thereof, both of said passages having their open lower ends in close proximity to the bottom of said element but spaced slightly from the extreme bottom end thereof after the element has descended fully into a container, a stopper slidable with a close fit on said element, means yieldingly urging said stopper downwardly on said element, stop means on said element for limiting the downward movement of said stopper on said element, said stopper having a shape and peripheral composition which will seat in the mouth of the container and seal it with pressure tight engagement while said element continues to descend into the container, said stopper having a passage therethrough from face to face, means for supplying compressed fluid to the outer end of said stopper passage so as to supply said fluid to the interior of said container and force the contents out through said passage, said stopper and element having cooperating portions automatically closing said stopper passage when said stopper is against said stop and automatically opening it when said stopper moves away from said stop, whereby when said element descends into a container, as soon as the stopper seats in the mouth of that container and the element continues to descend further into that container, said compressed fluid will be supplied to the interior of the container to force the contents of the container outwardly through said ascending passages, while said element continues its descent, and a valve operable to close one of said ascending passages, whereby the final emptying may be through one only of said ascending passages.

31. A device for emptying containers comprising a container support, an upright tubular element mounted above said support, means for causing relative vertical movement of said support and element so as to cause the lower end of said element to descend into a container on said support until the lower end of said element is in close proximity to the bottom of said container, said element having a pair of ascending, separate passages therein opening downwardly through the lower end of said element and extending above the mouth of said container, said element also having means communicating with the upper ends of said passages and conducting away any contents of said container which pass upwardly through said passages to the tops thereof, both of said passages having their open lower ends in close proximity to the bottom of said element but spaced slightly from the extreme bottom end thereof after the element has descended fully into a container, a stopper slidable with a close fit on said element, means yieldingly urging said stopper downwardly on said element, stop means on said element for limiting the downward movement of said stopper on said element, said stopper having a shape and peripheral composition which will seat in the mouth of the container and seal it with pressure tight engagement while said element continues to descend into the container, said stopper having a passage therethrough from face to face, means for supplying compressed fluid to the outer end of said stopper passage so as to supply said fluid to the interior of said container and force the contents out through said passage, said stopper and element having cooperating portions automatically closing said stopper passage when said stopper is against said stop and automatically opening it when said stopper moves away from said stop, whereby when said element descends into a container, as soon as the stopper seats in the mouth of that container and the element continues to descend further into that container, said compressed fluid will be supplied to the interior of the container to force the contents of the container outwardly through said ascending passages, while said element continues its descent, and a valve operable to close one of said ascending passages, whereby the final emptying may be through one only of said ascending passages, said valve being located at the upper end of the passage which it controls, whereby any of the contents forced out through that valve controlled passage to a point beyond that valve will continue to travel away from said element, and any contents remaining in that valve controlled passage below the valve will drain back into said container and be removed through the other passage.

32. A device for emptying containers comprising a support for a container to be emptied and supporting the container in approximately upright position, a tubular, upright element mounted above said support, means for causing relative movement between said support and element and thus relative descent of said element into a container on said support, until the lower end of said element is in close proximity to the bottom of said container, a stopper slidable on said element, means for yieldingly urging said stopper downwardly on said element, said element having a stop limiting the downward movement thereon of said stopper, said stopper being formed to seat in the mouth of the container with pressure tight engagement and seal the same and be held by the mouth of the container against further descent with said element, and also having a passage therethrough, and means for supplying a fluid under pressure to the outer end of said passage, said element and stopper having cooperating means which prevent flow of said fluid through said stopper passage when said stopper is in engagement with said stop, and for opening said stopper passage when said element continues to descend after the stopper has seated in the mouth of the container and been held back thereby, said element having an ascending passage therethrough, open at its lower end in close proximity to the bottom of the container and rising to a point above the mouth of said container and then extending laterally to the element, whereby when said element is above the container, the engagement of the stopper with said stop automatically prevents flow of the fluid under pressure through said stopper, and when said element descends into a container, the continued descent of said element in the container after the stopper seats in the container mouth will automatically start the emptying operation by delivering the fluid under pressure to the interior of the container at the under face of the stopper and cause removal of the contents through said ascending passage while the element continues to descend into the container approximately to the bottom thereof.

33. A device for emptying containers comprising a container support, an upright tubular element mounted above said support, means for causing relative vertical movement of said support and element so as to cause the lower end of said element to descend into a container on said support until the lower end of said element is in close proximity to the bottom of said container, said element having a pair of ascending, separate passages therein opening downwardly through the lower end of said element and extending above the mouth of said container, said element also having means communicating with the upper ends of said passages and conducting away any contents of said container which pass upwardly through said passages to the tops thereof, both of said passages having their open lower ends in close proximity to the bottom of said element but spaced slightly from the extreme bottom end thereof after the element has descended fully into a container, a stopper slidable with a close fit on said element, means yieldingly urging said stopper downwardly on said element, stop means on said element for limiting the downward movement of said stopper on said element, said stopper having a shape and peripheral composition which will seat in the mouth of the container and seal it with pressure tight engagement while said element continues to descend into the container, said stopper having a passage therethrough from face to face, means for supplying compressed fluid to the outer end of said stopper passage so as to supply said fluid to the interior of said container and force the contents out through said passage, said stopper and element having cooperating portions automatically closing said stopper passage when said stopper is against said stop and automatically opening it when said stopper moves away from said stop, whereby when said element descends into a container, as soon as the stopper seats in the mouth of that container and the element continues to descend further into that container, said compressed fluid will be supplied to the interior of the container to force the contents of the container outwardly through said ascending passages, while said element continues its descent, a valve operable to close one of said ascending passages, means responsive to the fluid pressure differences between the interior of said container and said ascending passages for automatically closing said valve when said pressure differences fall to that pressure difference created when the contents level in the container falls below the lower end of the valve controlled passage, and means controlled by the relative movement between said element and said container support for causing said valve to be open during at least part of the descent of said element and then releasing it to said automatic control, whereby as said element descends into the container both passages will be open to permit rise of the contents of the container in said passages and thus prevent overflowing of the contents at the mouth of the container by the displacement of the contents by said descending element.

34. A device for emptying a container, comprising an upright tubular element, a support for the container with the container in upright position disposed beneath said element, means mounting said support and element for relative movement to cause the lower end of said element to descend into a container on said support and then ascend therefrom, said element having therein a pair of ascending passages and a laterally extending common passage into which the upper ends of said ascending passages discharge, said element having a movable cover above the upper ends of said ascending passages, whereby when said cover is moved access may be had to the upper ends of both of said ascending passages, a valve element for one of said passages immediately below said cover and operable to open and close said one passage, said valve element having an operating extension projecting outwardly through said cover, and means operable when said element is within said container for forcing the contents of the container out through said passages by pressure differences in said container and said passages.

35. A device for emptying a container comprising an upright tubular element, a support for an upright container to be emptied, disposed beneath said tubular element, means for causing relative vertical movement between said element and said support and thereby causing the lower end of said element to descend into said container and then ascend therefrom, the depending portion of said element comprising a tubular shell, a tube of decidedly smaller diameter disposed within said shell, said shell having means at its bottom end for mounting said tube for endwise reciprocation, said element having a head at the upper end of said shell and of greater diameter than said shell, a sleeve mounted in said head for reciprocation vertically to form a variable extension of the passage of said shell, means connecting said sleeve and tube for endwise reciprocation together, said head having a chamber laterally of said sleeve, and said element having a passage leading from said chamber and draining downwardly therefrom, a dome within said head disposed over said sleeve, and against the under face of which said sleeve abuts when the tube and the sleeve are shifted upwardly, to close the passage through said shell, said dome slidingly receiving the upper end of said tube, and means extending from said connected tube and sleeve upwardly through said dome by which the tube and sleeve may be operated endwise to close or open the passage through said shell, said dome having a passage upwardly therethrough in communication with the upper end of said tube, whereby a fluid may pass upwardly through said tube and said dome and thence into said chamber, even when said sleeve is in engagement with said dome to close the passage through said shell.

36. A device for emptying a container, comprising an upright tubular element, a support for the container with the container in upright position disposed beneath said element, means mounting said support and element for relative movement to cause the lower end of said element to descend into a container on said support and then ascend therefrom, said element having therein a pair of ascending passages, one of which passages is a tube within the other passage, and a laterally extending common passage into which the upper ends of said ascending passages discharge, said element having a movable cover above the upper ends of said ascending passages, whereby when said cover is moved access may be had to the upper ends of both of said ascending passages, a valve element for one of said passages immediately below said cover, removable from said element through the end covered by said cover after the latter has been moved to open said element, and operable to open and close said one passage, said valve element having an operating extension projecting outwardly through said cover, one of said ascending passages being formed by a tube disposed within the other passage and mounted for removal through the upper end of said element after said movable cover has been moved to open said element, and means operable when said element is within said container for forcing the contents of the container out through said passages by pressure differences in said container and said passages.

E. ROY ALLING.